(12) United States Patent
Hillel et al.

(10) Patent No.: US 11,468,068 B2
(45) Date of Patent: *Oct. 11, 2022

(54) METHOD AND SYSTEM FOR CONCURRENT GENERATION OF DATA SKETCHES

(71) Applicant: VERIZON PATENT AND LICENSING INC., Basking Ridge, NJ (US)

(72) Inventors: Eshcar Hillel, Binyamina (IL); Edward Bortnikov, Haifa (IL); Idit Keidar, Haifa (IL); Alexander Spiegelman, Yokneam Illit (IL); Lee Rhodes, Los Altos, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,204

(22) Filed: Dec. 28, 2018

(65) Prior Publication Data

US 2020/0210434 A1 Jul. 2, 2020

(51) Int. Cl.
*G06F 16/2455* (2019.01)
*G06F 16/22* (2019.01)
*G06F 16/27* (2019.01)
*G06F 7/08* (2006.01)

(52) U.S. Cl.
CPC .......... *G06F 16/24568* (2019.01); *G06F 7/08* (2013.01); *G06F 16/2255* (2019.01); *G06F 16/27* (2019.01)

(58) Field of Classification Search
CPC ............... G06F 16/24568; G06F 16/27; G06F 16/2255; G06F 7/08

USPC .......................................... 707/626
See application file for complete search history.

(56) References Cited

U.S. PATENT DOCUMENTS

| | | | |
|---|---|---|---|
| 8,819,038 B1 * | 8/2014 | Rhodes | G06F 16/254 707/756 |
| 10,735,949 B1 * | 8/2020 | Reeves | H04W 8/245 |
| 2010/0306222 A1 * | 12/2010 | Freedman | G06F 16/9027 707/759 |
| 2011/0099187 A1 * | 4/2011 | Hansen | G06F 16/9014 707/769 |
| 2011/0237254 A1 * | 9/2011 | Lee | H04N 21/472 455/435.2 |
| 2013/0031440 A1 | 1/2013 | Sharon et al. | |
| 2015/0163104 A1 * | 6/2015 | Coster | H04L 43/08 709/224 |

(Continued)

OTHER PUBLICATIONS

Office Action dated Aug. 10, 2020 in U.S. Appl. No. 16/235,259.
Office Action dated Nov. 30, 2020 in U.S. Appl. No. 16/235,259.
Office Action dated Jun. 28, 2021 in U.S. Appl. No. 16/235,259.

*Primary Examiner* — Allen S Lin

(57) ABSTRACT

The present teaching relates to a method and system generating a data sketch. A plurality of local data sketches are generated, wherein for each local data sketch, it is determined whether a propagation condition is satisfied. In response to the condition being satisfied, the local data sketch is processed when a synchronization parameter satisfies a criterion. The synchronization parameter is set to a predetermined value to enable propagation of the local data sketch to the data sketch. Upon the local data sketch being propagated to the data sketch, the above steps are repeated.

20 Claims, 21 Drawing Sheets

(56) References Cited

U.S. PATENT DOCUMENTS

2018/0039661 A1   2/2018  Kirshenbaum et al.
2018/0268474 A1*  9/2018  Lugowski ............. G06Q 30/08
2019/0050465 A1*  2/2019  Khalil .................. G06F 16/285
2019/0121567 A1*  4/2019  Kim ..................... G06F 3/0644

* cited by examiner

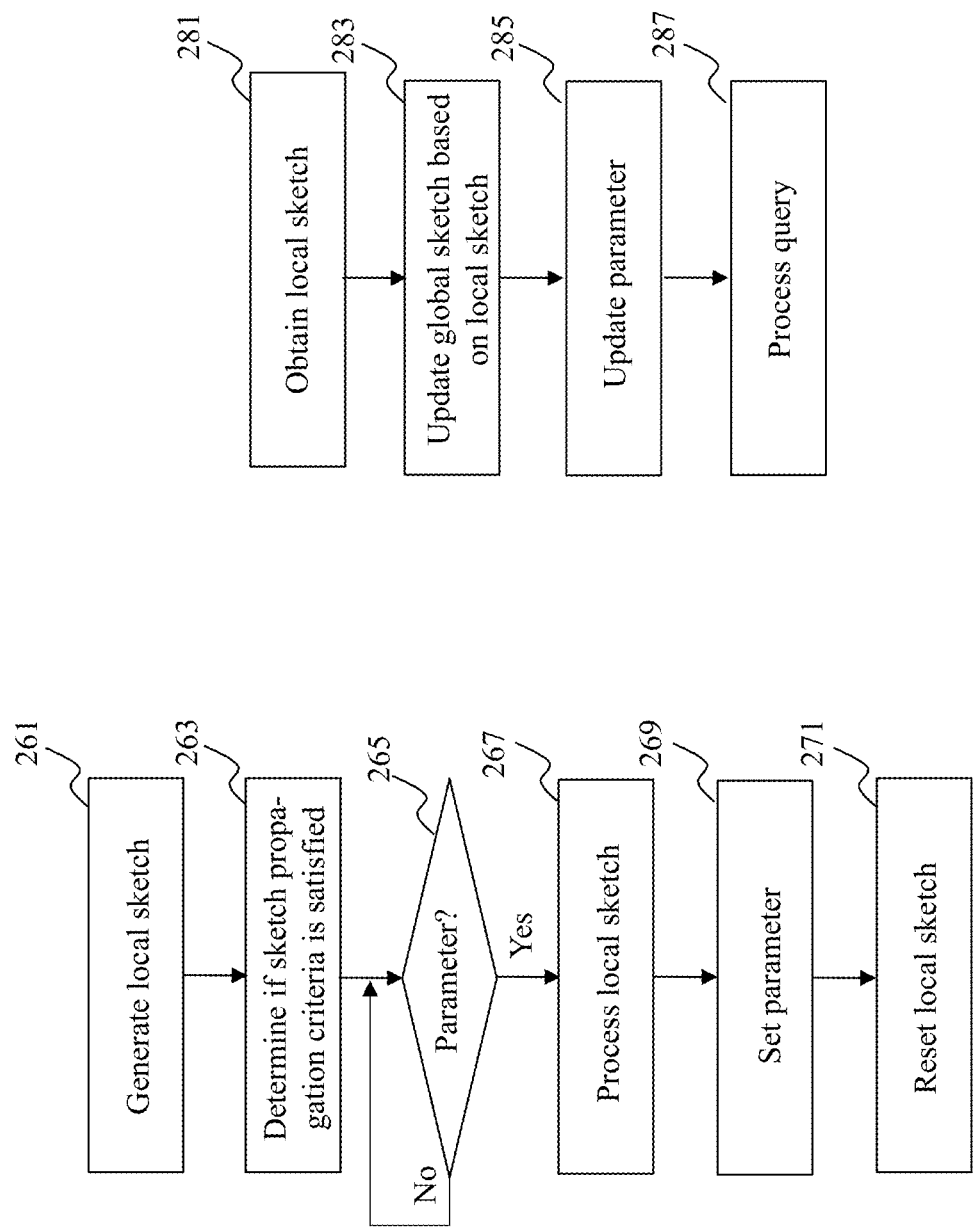

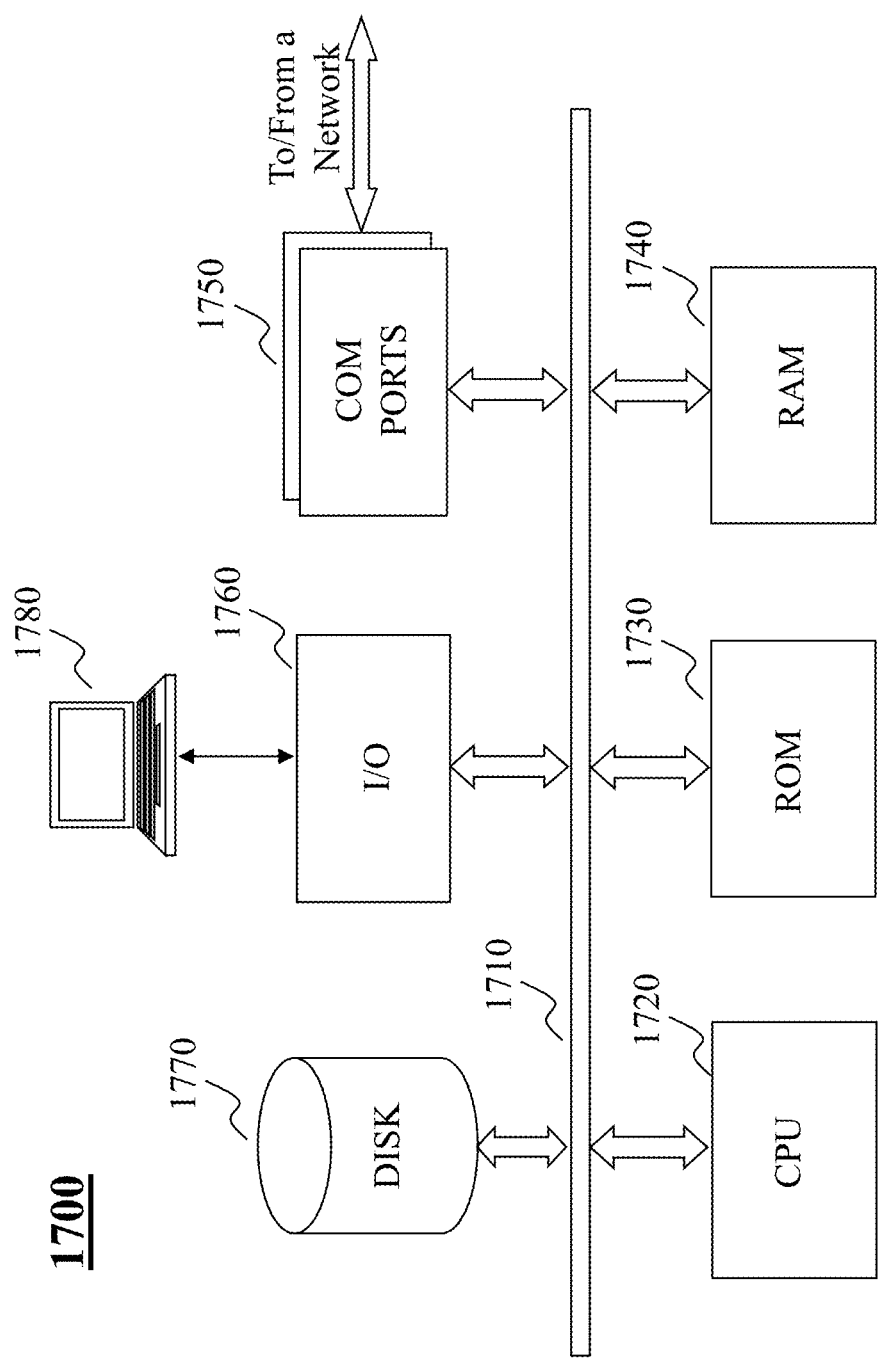

METHOD AND SYSTEM FOR CONCURRENT GENERATION OF DATA SKETCHES

BACKGROUND

1. Technical Field

The present teaching generally relates to data processing. More specifically, the present teaching relates to techniques of generating and processing data sketches in a concurrent manner.

2. Technical Background

In the age of the Internet, amount of data available becomes explosive. Great effort has been made to analyze the vast amount of data to make some sense out of it in order to improve the efficiency associated with data access. Real-time analytics are becoming increasingly prevalent in many businesses. For instance, Big-data analytics often needs to answer queries that capture the salient properties of large data streams. A common query, for example, is estimating the number of unique elements in a long data stream, which can be used for instance, to count how many different users access a particular web page or application. A second example is a quantiles estimation query, such as 'what percentage (or quantile) of user sessions end within one minute?' or 'what is the median session time?'.

In order to serve such queries, analytics engines use data sketches. A data sketch is essentially a succinct summary of a long data stream. Data sketches are typically built in a single pass over the data stream via sampling or by applying a filter that retains a small subset of the data stream elements. Due to the massive scale of incoming data, analytics engines are designed to be fast, often digesting millions of stream elements per second.

Despite the popularity of data sketches in analytics engines, typical implementations of the data sketches are not thread-safe. Specifically, each data sketch can be accessed by at most one thread (i.e., an execution process) at any given time. Furthermore, the data sketch is built in epochs (i.e., a predetermined time-period), wherein the data sketch is generated in a certain time-period and querying the data sketch is permitted only after conclusion of the time-period.

With regards to multi-core platforms, a commonly used technique to expedite generation of a shared data sketch, is that of building separate data sketches from sub-data streams, and then merging the various data sketches via a dedicated union operation. A drawback of such an approach is that queries cannot be served before the union operation of the various data sketches is completed. Moreover, access to shared data requires synchronization, which is typically achieved via costly memory fences.

Accordingly, there is a requirement for an analytics engine that concurrently generates a data sketch in a cost-effective synchronized manner.

SUMMARY

The teachings disclosed herein relate to methods, systems, and programming for generating and processing data sketches in a concurrent manner. Specifically, the teachings disclosed herein provide for parallel construction of a data sketch via multiple threads and allows queries to be processed while the data sketch is being built.

One aspect of the present disclosure provides for a method, implemented on a machine having at least one processor, storage, and a communication platform capable of connecting to a network for generating a data sketch. The method includes generating a plurality of local data sketches. For each local data sketch, the method includes the steps of determining whether a propagation condition is satisfied, processing, in response to the condition being satisfied, the local data sketch when a synchronization parameter satisfies a criterion, setting the synchronization parameter to a predetermined value to enable propagation of the local data sketch to the data sketch, and repeating the steps of generating, determining, processing and setting, upon the local data sketch being propagated to the data sketch.

By one aspect of the present disclosure, there is provided a system for generating a data sketch. The system includes a local sketch generator configured for generating a local data sketch. The system includes a triggering unit configured for determining whether a propagation condition associated with the local data sketch is satisfied, and a processing unit configured for processing, in response to the condition being satisfied, the local data sketch when a synchronization parameter satisfies a criterion. Further, the system includes a parameter setting unit configured for setting the synchronization parameter to a predetermined value to enable propagation of the local data sketch to the data sketch, and a synchronization unit configured for initiating a repetition of the generating, determining, processing and setting, upon the local data sketch being propagated to the data sketch.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a non-transitory computer readable medium including computer executable instructions, wherein the instructions, when executed by a computer, cause the computer to perform a method for generating a data sketch. The method includes generating a plurality of local data sketches. For each local data sketch, the method includes the steps of determining whether a propagation condition is satisfied, processing, in response to the condition being satisfied, the local data sketch when a synchronization parameter satisfies a criterion, setting the synchronization parameter to a predetermined value to enable propagation of the local data sketch to the data sketch, and repeating the steps of generating, determining, processing and setting, upon the local data sketch being propagated to the data sketch.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2B is a flowchart of an exemplary process of a worker thread in an analytics engine, according to an embodiment of the present teaching;

FIG. 2C is a flowchart of an exemplary process of a propagator thread in an analytics engine, according to an embodiment of the present teaching;

FIG. 17 depicts the architecture of a computer which can be used to implement a specialized system incorporating the present teaching.

DETAILED DESCRIPTION

Figure 1A:
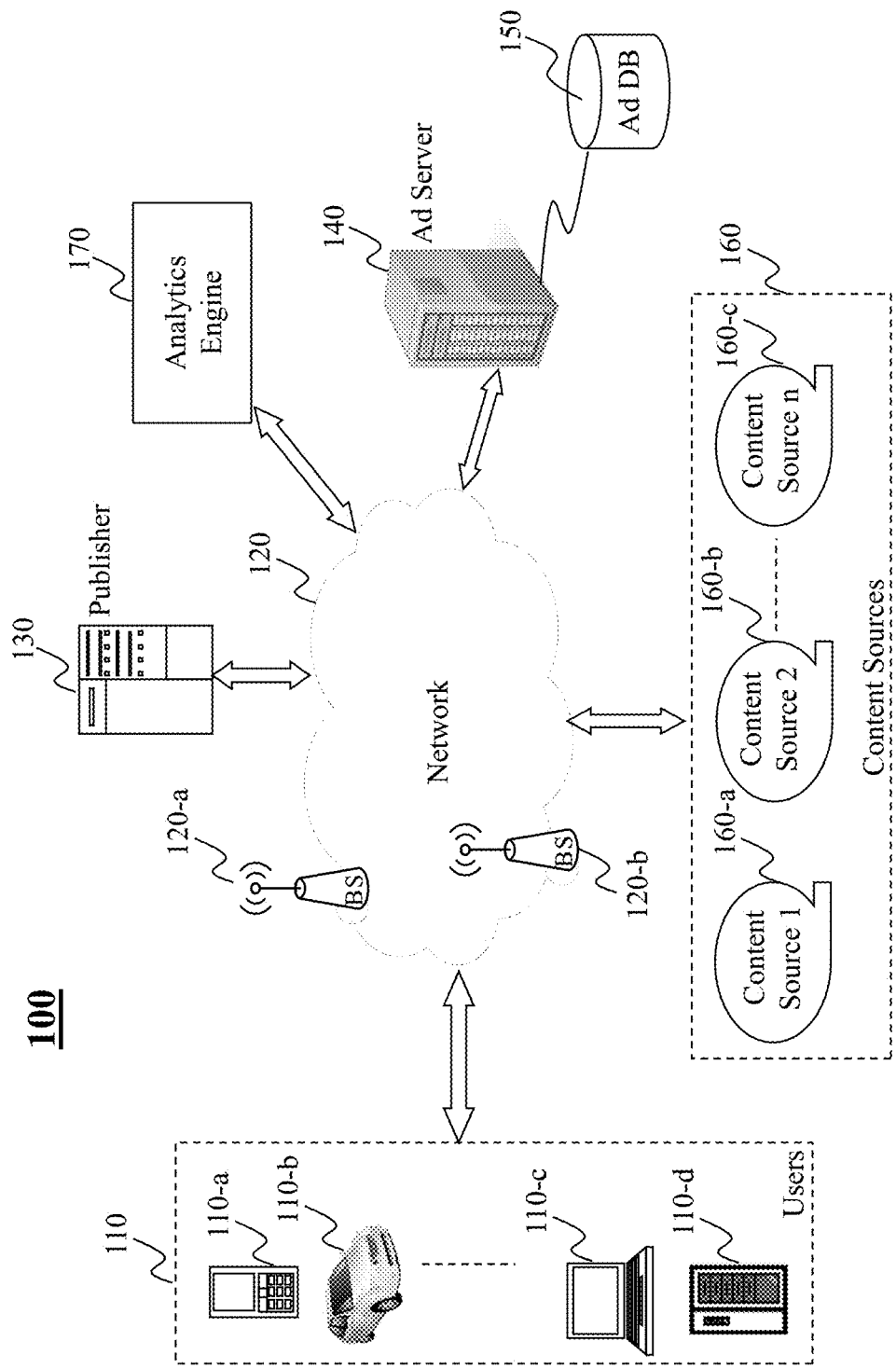
FIGS. 1A-1C depict different operational configurations of an analytics engine in a network setting, according to different embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Analytics engines need to answer real-time queries while stream data continues to flow in. According to embodiments of the present teaching, there is provided a technique of building concurrent sketches that constantly reflect all data processed by multiple threads and serve queries at any time. Specifically, multiple threads i.e., processing entities (also referred to herein as worker nodes or worker threads) buffer sketches of bounded-size sub-streams in their local memories respectively, while a dedicated master thread (also referred to therein as a master node or propagator thread) periodically propagates the local buffers into a shared data structure (i.e., a shared data sketch). Reducing data contention and frequency of synchronization between the worker threads and the propagator thread is important for achieving good performance. Accordingly, as described herein, the present teaching provides an efficient cost-effective technique of serving queries based on the shared data structure and synchronizing the multiple worker threads with the propagator thread.

Figure 1B:
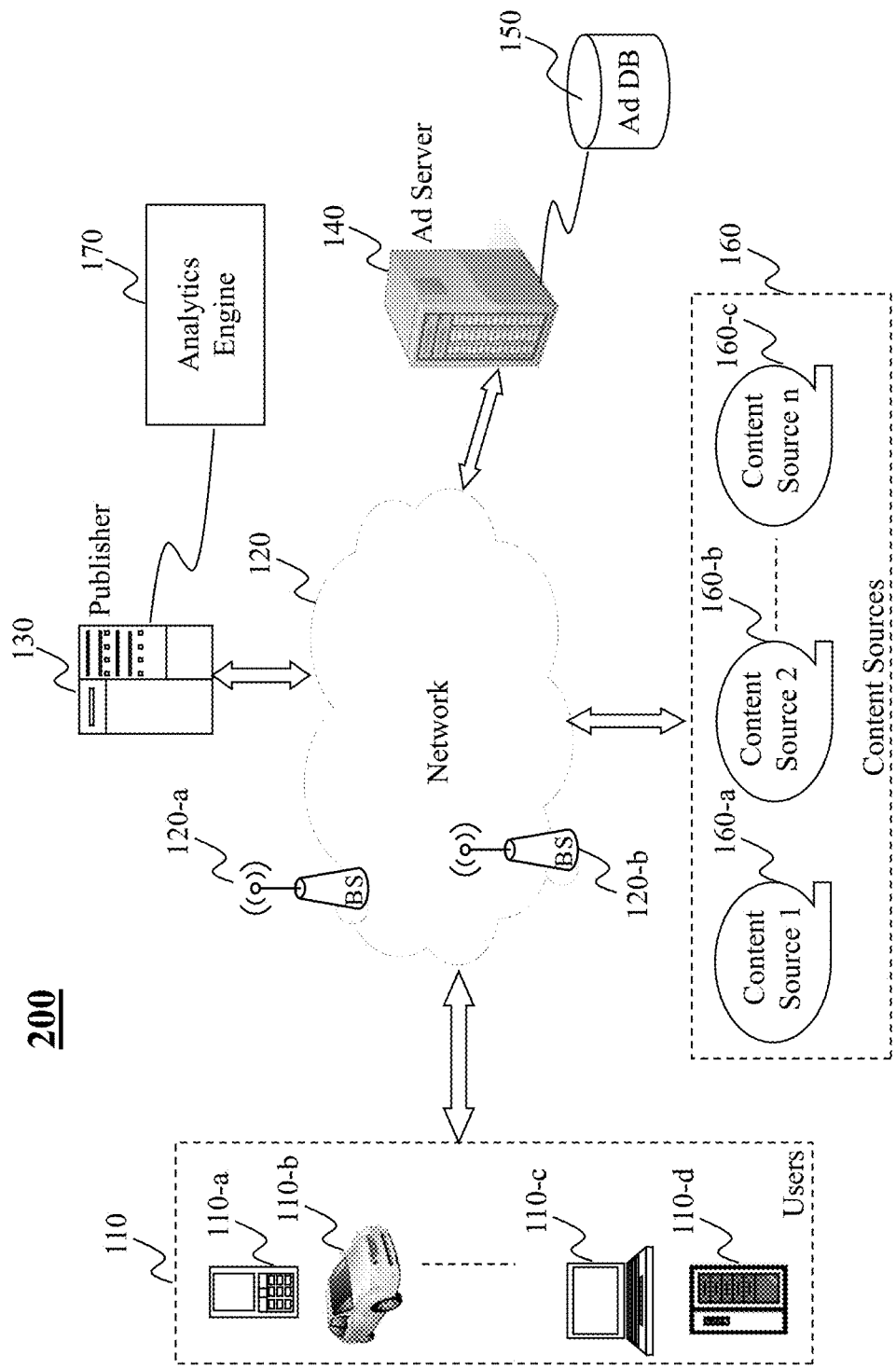
Figure 1C:
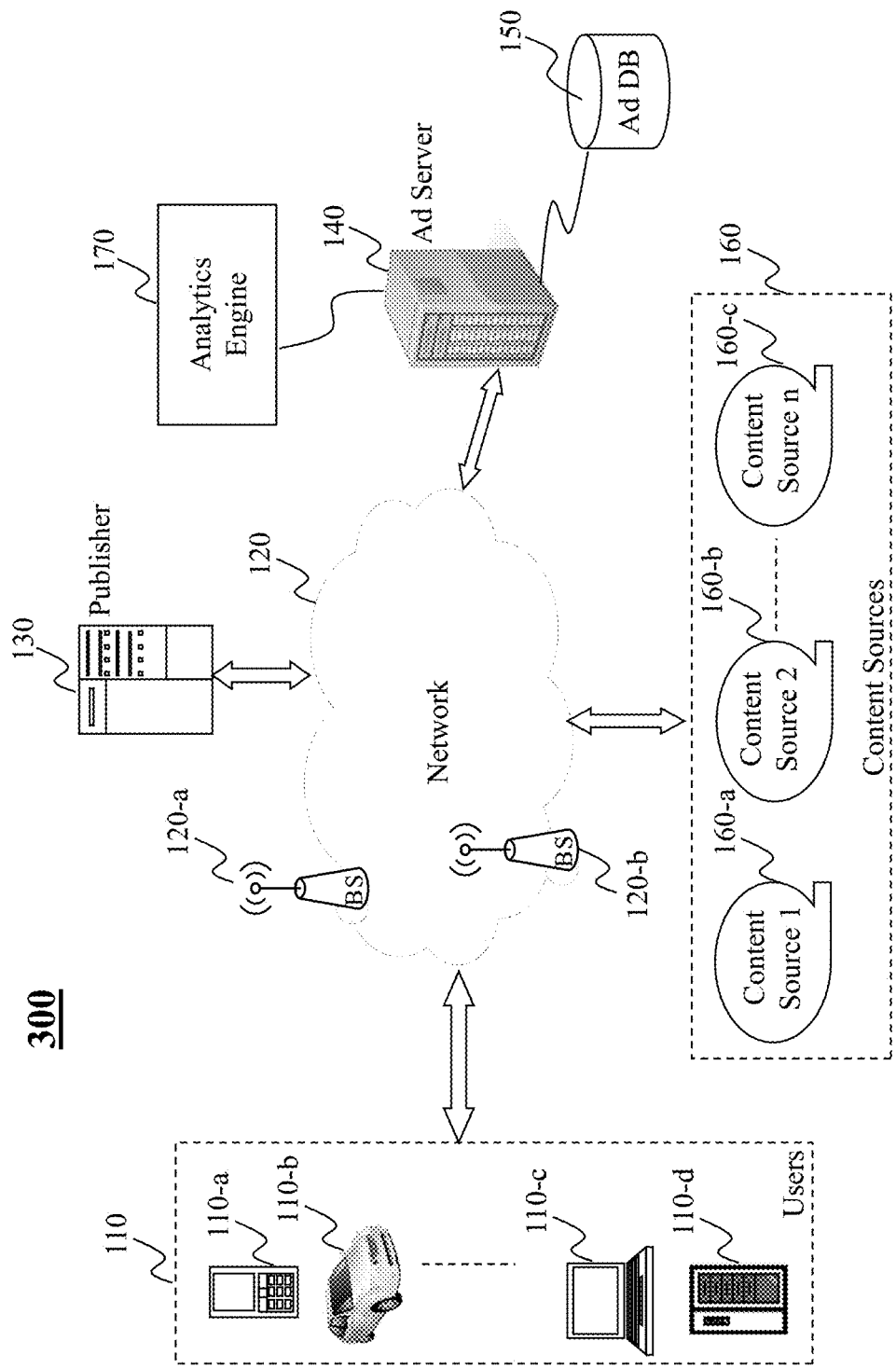

FIGS. 1A-1C depict different operational configurations of an analytics engine in a network setting, according to different embodiments of the present teaching. In FIG. 1A, an exemplary system configuration 100 includes users 110, a network 120, an exemplary publisher 130, content sources 160 including content source 1 160-a, content source 2 160-b, content source n 160-c, an advertisement server 140, and an analytics engine 170. In this illustrated embodiment, the analytics engine 170 is directly connected to the network 120 and operates as an independent service engine that processes data streams (e.g., information included in user interactions with online content) to answer queries related to the data streams in real time. For instance, the analytics engine 170 may receive a query from the publisher 130 to estimate a number of unique elements in a data stream. The number may be used to count how many different users access a particular web page, application, or an advertisement which stored in an advertisement database 150 and provided to the users by the advertisement server 150. Based on the query, the analytics engine 170 generates a data sketch and provides a response to the query to the publisher 130 via the network 120.

In this embodiment, as the analytics engine 170 is a stand-alone service, it may provide its services to a plurality of publishers 130 and a plurality of advertisement servers 140 (not shown plurality of each). It must be appreciated that in some applications, the analytics engine 170 may also be used to issue responses to queries issued by other parties e.g., advertisers, third-party service providers, etc.

In FIG. 1B, an alternative configuration 200 is provided, in which the analytics engine 170 is connected to a publisher 130 as its backend service engine. That is, in this embodiment, the analytics engine 170 is a special module in the backend of the publisher 130. When there are multiple publishers (not shown), each may have its own backend module for processing respective data streams and providing responses to queries in real time.

In FIG. 1C, yet another alternative configuration 300 is provided, in which the analytics engine 170 is connected to an advertisement server 140 as a backend service engine. That is, in this embodiment, the analytics engine 170 is a special module in the backend of the advertisement server 140. When there are multiple advertisement servers, each may have its own backend module for processing respective data streams and providing responses to queries in real time.

In FIGS. 1A-1C, the network 120 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a Bluetooth network, a virtual network, or any combination thereof. The network 120 may also include various network access points, e.g., wired or wireless access points such as base stations 120-a, 120-b, or Internet exchange points (not shown) through which a data source may connect to the network 120 in order to transmit/receive information via the network.

In some embodiments, the network 120 may be an online advertising network or an ad network, which connects the analytics engine 170 to/from the publisher 130 or websites/mobile applications hosted thereon that desire to receive or display advertisements. Functions of an ad network may include an aggregation of ad-space supply from the publisher 130, ad supply from the advertisement server 140, etc. An ad network may be any type of advertising network environments such as a television ad network, a print ad network, an online (Internet) ad network, or a mobile ad network.

The publisher 130 can be a content provider, a search engine, a content portal, or any other sources from which content can be published. The publisher 130 may correspond to an entity, whether an individual, a firm, or an organization, publishing or supplying content, including a blogger, television station, a newspaper issuer, a web page host, a content portal, an online service provider, or a game server. For example, in connection to an online or mobile ad network, publisher 130 may also be an organization such as USPTO.gov and CNN.com, or a content portal such as YouTube and Yahoo.com, or a content-soliciting/feeding source such as Twitter, Facebook, or blogs. In one example, content sent to a user may be generated or formatted by the publisher 130 based on data provided by or retrieved from the content sources 160.

The content sources 160 may correspond to content/app providers, which may include, but not limited to, to an individual, a business entity, or a content collection agency such as Twitter, Facebook, or blogs, that gather different types of content, online or offline, such as news, papers, blogs, social media communications, magazines, whether textual, audio visual such as images or video content. The publisher may also be a content portal presenting content originated by a different entity (either an original content generator or a content distributor). Examples of a content portal include, e.g., Yahoo! Finance, Yahoo! Sports, AOL, and ESPN. The content from content sources 160 include multi-media content or text or any other form of content including website content, social media content from, e.g., Facebook, Twitter, Reddit, etc., or any other content generators. The gathered content may be licensed content from providers such as AP and Reuters. It may also be content crawled and indexed from various sources on the Internet. Content sources 160 provide a vast range of content that are searchable or obtainable by the publisher 130.

Users 110 may be of different types such as ones connected to the network via wired or wireless connections via a device such as a desktop 110-d, a laptop 110-c, a handheld device 110-a, a built-in device embedded in a vehicle such as a motor vehicle 110-b, or wearable devices (e.g., glasses, wrist watch, etc.). In one embodiment, users 110 may be connected to the network 120 to access and interact with online content (provided by the publisher 130), via wired or wireless means, through related operating systems and/or interfaces implemented within the relevant user interfaces.

By one embodiment of the present teaching, in operation, a request for an advertisement from the publisher 130 is received by the advertisement server 140, which may be centralized or distributed. The advertisement server 140 may archive data related to a plurality of advertisements in an advertisement database 150, which may or may not reside in the cloud. The advertisement server 140 operates to distribute advertisements to appropriate ad placement opportunities on different platforms. The advertisements accessible by the advertisement server 140 may include some textual information, e.g., a description of what the advertisement is about as well as additional information such as target audience as well as certain distribution criteria related to, e.g., geographical coverage or timing related requirements. Target audience may be specified in terms of, e.g., demographics of the target audience, the distribution criteria may specify geographical locations of the target audience, and/or time frame(s) the advertisement is to be distributed to the target audience.

When a request is received from the publisher 130 for an advertisement, either the publisher 130 or the advertisement server 140 may invoke the analytics engine to process the relevant data streams (e.g., a data stream including information related to user interaction with online content) and provide responses to queries that capture salient properties of the data streams as described above. In what follows, there is first provided a technique for generating a concurrent sketch according to an embodiment of the present teaching. Further, there is provided techniques for generation of specific types of concurrent data sketches, namely a concurrent theta sketch and a concurrent quantile sketch.

Figure 2A:
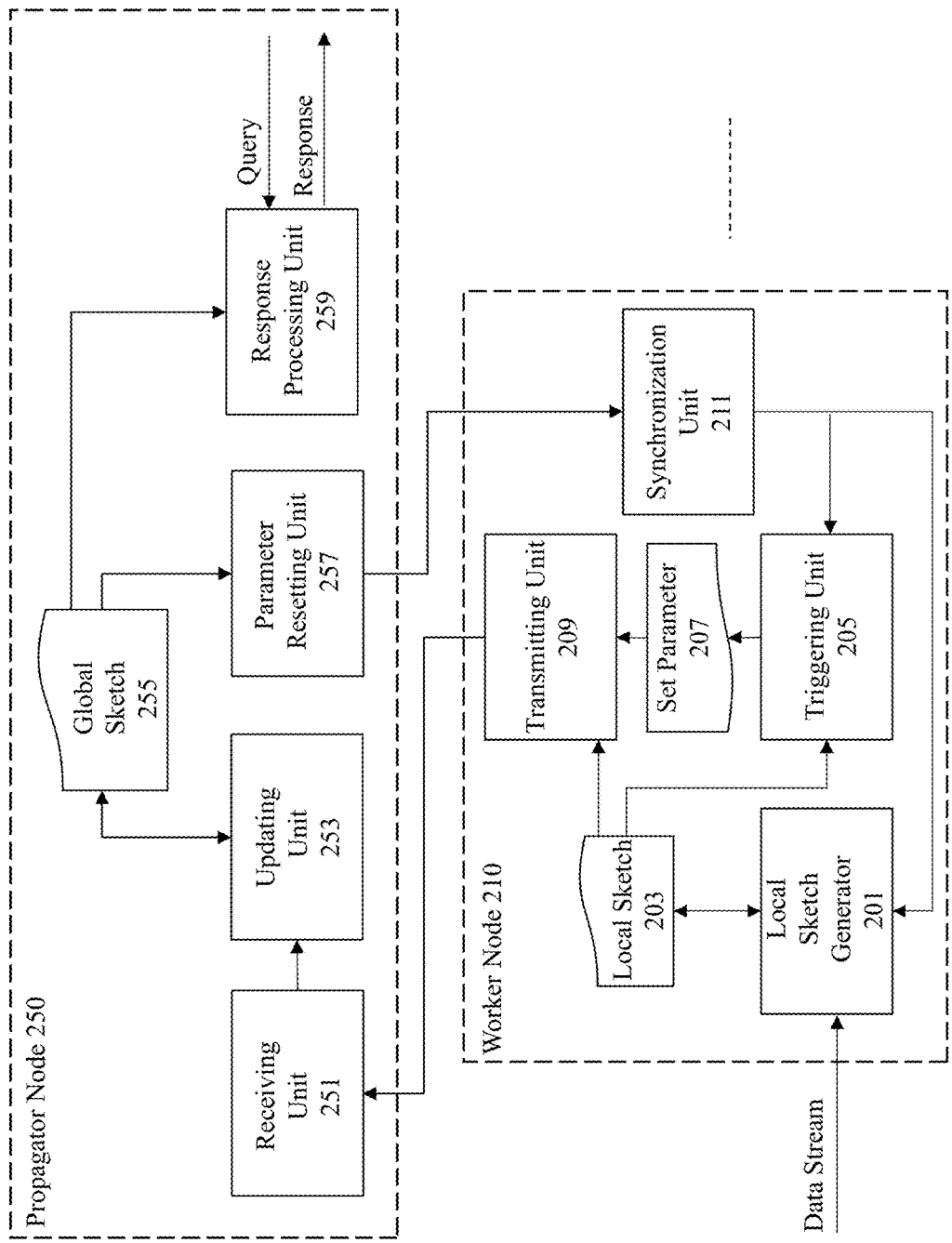
FIG. 2A depicts an exemplary high-level system diagram of an analytics engine, according to an embodiment of the present teaching.

FIG. 2A depicts an exemplary high-level system diagram of an analytics engine, according to an embodiment of the present teaching. The analytics engine 170 is configured to generate a concurrent data sketch. As shown in FIG. 2A, the analytics engine 170 includes a propagator thread 250 (also referred to herein as a propagator node) and multiple worker threads 210 (also referred to herein as worker nodes). Note that for sake of clarity, FIG. 2A depicts only a single worker thread 210. However, the configuration of other worker threads is similar to the worker thread 210 as shown in FIG. 2A. The worker thread 210 includes a local sketch generator 201, a triggering unit 205, a transmitting unit 209, and a synchronization unit 211. The propagator thread 250 includes a receiving unit 251, an updating unit 253, a parameter resetting unit 257, and a response processing unit 259.

Each worker thread 210 processes a stream of data elements respectively. As shown in FIG. 2A, the local sketch generator 201 included in the worker thread 210 receives incoming data stream elements and generates a local sketch 203 in accordance with a model. Specifically, the model implemented by the worker thread 210 is determined based on a type of data sketch that is to be generated.

The triggering unit 205 determines whether a propagation condition associated with the local sketch 203 is satisfied. For example, the triggering unit 205 may determine whether the local sketch 203 includes a predetermined number of processed data elements. Each worker thread 210 synchronizes with the propagator thread 250 based on a synchronization parameter. The synchronization parameter is set by the propagator thread 250 and utilized by the worker thread 210 via the synchronization unit 211 included in the worker thread 210. The triggering unit 205 determines whether the synchronization parameter satisfies a criterion. For instance, the triggering unit 205 determines whether the synchronization parameter is greater than a predetermined value.

By one embodiment of the present teaching, in response to the synchronization parameter satisfying the criterion, the local sketch generator 201 may utilize the updated value of the synchronization parameter to update an attribute associated with the local sketch, and also perform further processing of the data elements included in the local sketch 203. For example, the data elements included in the local sketch may be sorted in a predetermined fashion (e.g., ascending order).

Upon the data elements in the local sketch being processed, the triggering unit 205 sets the value of the synchronization parameter to the predetermined threshold value. The setting 207 of the synchronization parameter indicates that the local sketch 203 is ready to be propagated to the propagator thread 250 for further processing. By one embodiment of the present teaching, as shown in FIG. 2A, the transmitting unit 209 may transfer the local sketch 203 to the propagator thread 250 for further processing. However, it must be appreciated that the implementation of the data sketch is in no way limited to the specific configuration as depicted in FIG. 2A. For instance, according to one embodiment of the present teaching, the worker thread 210 may not include the transmitting unit 209. Rather, the propagator thread 250 may directly access the local memory of the worker thread 210 to propagate the local sketch 203 for further processing.

The propagator thread 250 upon obtaining the local sketch (by the receiving unit 251) proceeds to further process the local sketch. Specifically, by one embodiment, the updating unit 253 merges the elements included in the local sketch with contents of a global sketch 255. Upon completion of the merging of the local sketch 203 with the global sketch 255, the parameter resetting unit 257 included in the propagator thread 250 resets the value of the synchronization parameter i.e., a value different than the threshold value of the parameter. The updated value of the synchronization parameter is utilized by the worker thread 210 to continue processing the next elements of the sub-stream data. The response processing unit 259 of the propagator thread 250 receives a query related to the data elements included in the global sketch. By one embodiment of the present teaching, the response processing unit 259 is configured to obtain a consistent snapshot of the global data-sketch 255, and further process the global data-sketch to generate a response to the query.

FIG. 2B depicts a flowchart of an exemplary process of a worker thread in an analytics engine, according to an embodiment of the present teaching. The process commences in step 261, wherein the worker thread generates a local sketch based on data elements included in a data stream in accordance with a model. In step 263, the worker thread determines whether a propagation criterion associated with the local sketch is satisfied.

The process then moves to step 265, wherein a query is performed to determine whether a value of a synchronization parameter is greater than a predetermined threshold value. For example, it may be determined whether the synchronization parameter is greater than zero. If the response to the query is negative, the process enters a wait phase. In other words, the process waits until the value of the synchronization parameter is greater than the predetermined threshold value.

If the response to the query in step 265 is affirmative, the process moves to step 267, wherein the worker thread further processes elements included in the local sketch. For example, the worker thread may generate an auxiliary array which includes the elements of the local sketch sorted according to a predetermined order e.g., ascending order.

Thereafter, the process moves to step 269, wherein the worker thread sets the value of the synchronization parameter to the predetermined threshold value (e.g. sets the synchronization parameter to a value of zero) to indicate to the propagator thread that the auxiliary array is ready to be propagated. Further, in step 271, upon propagation of the auxiliary array, the worker thread resets the local sketch to process the next set of data elements in the data stream.

FIG. 2C is a flowchart of an exemplary process of a propagator thread in an analytics engine, according to an embodiment of the present teaching. The process commences in step 281, wherein the propagator thread obtains the processed local sketch, e.g., the auxiliary array sorted by the worker thread.

In step 283, the propagator thread updates the global sketch based on obtained auxiliary array. For instance, the propagator thread may merge the contents of the auxiliary array with the global sketch in accordance with a set of rules. Thereafter, the propagator thread updates the value of the synchronization parameter in step 285. Note that the updated value of the synchronization parameter is utilized by the worker thread to continue processing the next set of data elements in the data stream. Further, in step 287, the propagator thread generates a response to a received query based on the global-sketch.

In what follows, there is provided a detailed description regarding the concurrent generation of two types of sketches: a theta sketch and a quantile sketch. For each type of sketch there is first provided a description pertaining to the generation of the data sketch by a single worker thread (referred to herein as sequential data sketch generation), followed by a description of concurrent generation of a shared sketch by multiple worker threads.

Figure 3:
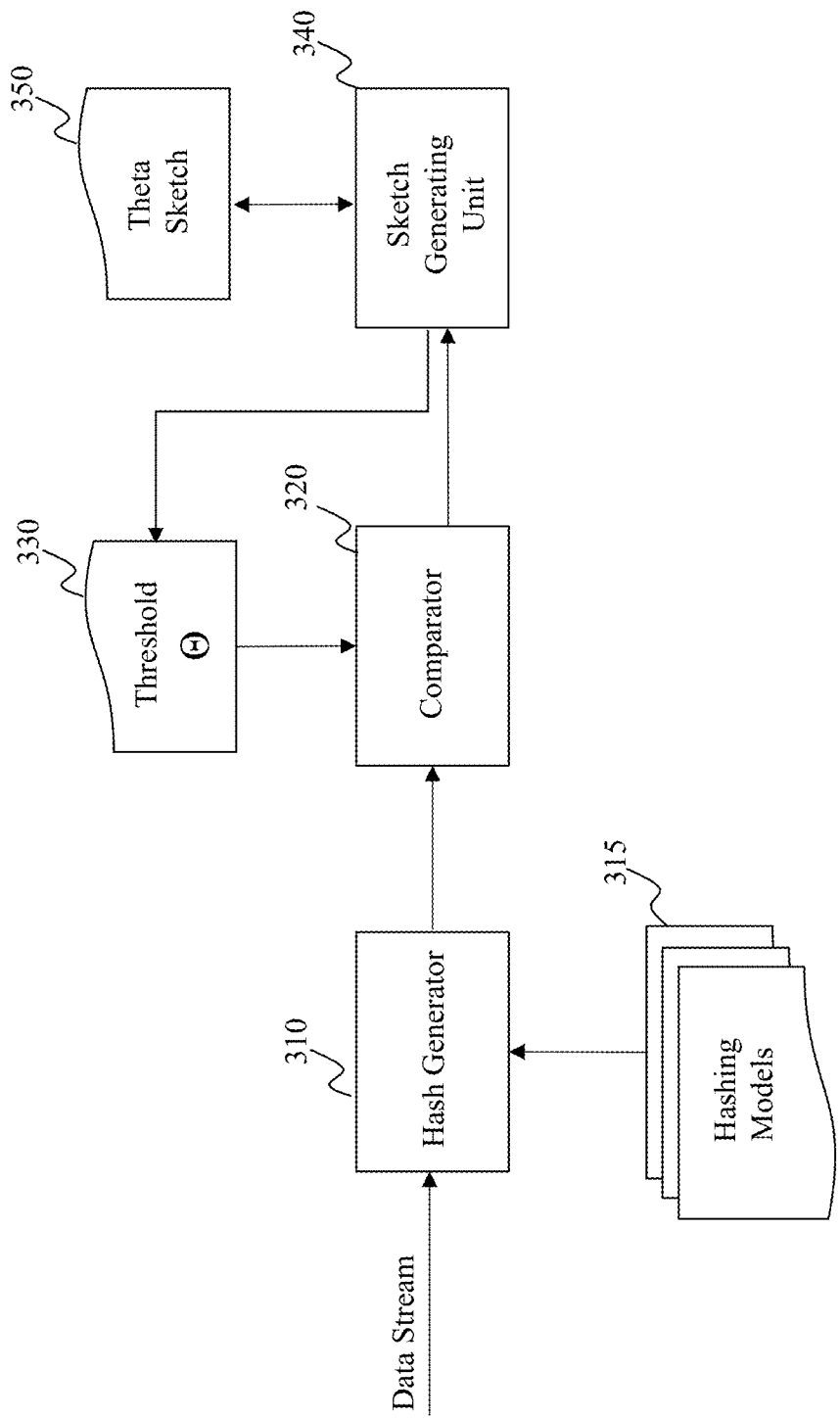
FIG. 3 depicts an exemplary high-level system diagram of a sequential theta sketch generator, according to an embodiment of the present teaching.

FIG. 3 depicts an exemplary high-level system diagram of a sequential Theta sketch generator (also referred to herein as Θ-sketch generator), according to an embodiment of the present teaching. The Θ-sketch generator includes a hash generator 310, a comparator 320, and a sketch generating unit 340. The sketch generating unit 340 is configured to generate a Θ-sketch 350, which is associated with a threshold value (Θ) 330. The Θ-sketch 350 may be generated to address queries such as "what is the number of unique data elements in a data stream?".

By one embodiment of the present teaching, the data-structure associated with the Θ-sketch 350 is a fixed sized array (i.e., an array of K elements). A Θ-sketch including K elements (or samples) provides, within a bounded error, an unbiased approximation of the number of unique data elements that are included in an input data stream, as described below.

The hash generator 310 computes a hash value for each element of an input data stream in accordance with a hashing model 315. The hashing model 315 may be a hash function whose outputs are uniformly distributed in a predetermined range (e.g., in a range from 0 to 1). Moreover, the value of the threshold Θ 330 associated with the Θ-sketch is also maintained within the same predetermined range.

The comparator 320 compares the hash value of the input data element to the threshold Θ, 330. In case the hash value is smaller than the threshold Θ, 330, then the hash value is transmitted to the sketch generating unit 340 to be included in the Θ-sketch 350. If the hash value of the data element is greater than the threshold Θ, 330, then the corresponding data element (and its hash value) is ignored. It must be appreciated that since the hash outputs are uniformly distributed in the predetermined range, an expected portion (Θ) of the hash values are smaller than the threshold Θ and are thus included in the Θ-sketch. Accordingly, one can estimate the number of unique data elements in the input data stream by simply dividing the number of (unique) stored samples in the Θ-sketch by the value of the threshold Θ. Moreover, the error in the approximation of the number of unique elements in the data stream depends on the size of the Θ-sketch i.e., the size K of the fixed array.

The Θ-sketch 350 is a fixed sized array maintained independently of the size of the input data stream. Moreover, the sketch generating unit 340 adjusts the threshold Θ 330 on the fly, and prunes elements of the data stream whose hashes are greater than the threshold Θ 330. Specifically, when the predetermined range of the hashing function 315 is between 0-1, the threshold Θ, 330 is assigned a value of 1 for the first K updates. Thereafter, the sketch generating unit 340 adjusts the value of the threshold Θ 330 to be the largest element in the array. Specifically, once the fixed sized array is full, every update that inserts a new element into the array, also removes the largest element in the array. The threshold Θ is updated by assigning the largest element as the new threshold Θ. It must be appreciated that since the size of the fixed array is considerably smaller than the number of elements (N) in the data stream (i.e., K<<N), the vast majority of hashes are larger than 0, and thus most update operations complete without updating the fixed sized array.

Figure 4:
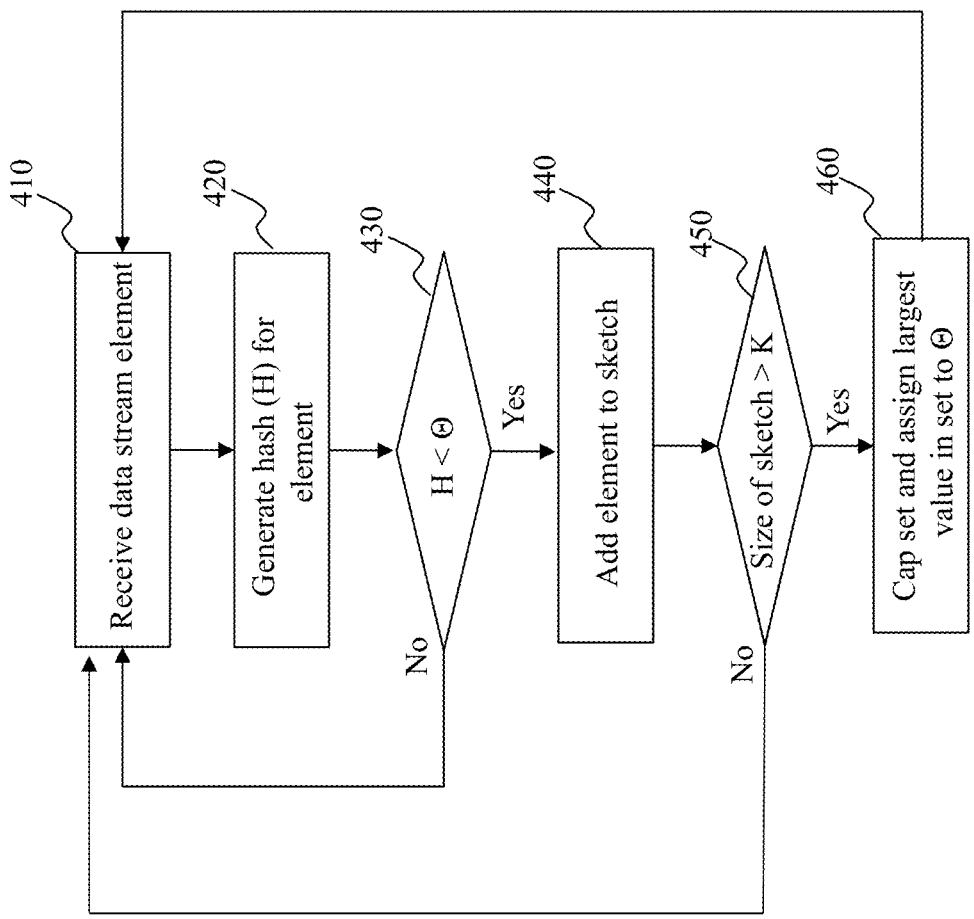
FIG. 4 is a flowchart of an exemplary process of a sequential theta sketch generator, according to an embodiment of the present teaching.

FIG. 4 is a flowchart of an exemplary process of a sequential Θ-sketch generator, according to an embodiment of the present teaching. The process commences in step 410, wherein the Θ-sketch generator receives a data element from an input data stream. In step 420, a hash value for the data element is computed in accordance with a hashing model.

In step 430, a query is performed to determine whether the computed hash value of the data element is smaller than a threshold (Θ) associated with the Θ-sketch. If the response to the query is negative, the process loops back to step 410 to process the next element of the data stream. However, if the response to the query if affirmative, the process moves to step 440.

In step 440, the hash value associated with the data element is added to the Θ-sketch. The process then proceeds to step 450, wherein a further query is performed to determine whether a size of the Θ-sketch (i.e., number of samples included in the Θ-sketch) is greater than the predetermined size of K elements. If the response to the query is negative, the process loops back to step 410.

However, if the response to the query in step 450 is affirmative, the process proceeds to step 460, wherein the size of the Θ-sketch is maintained at the pre-determined value (K), and largest sample in the Θ-sketch (i.e., the largest hash value computed thus far) is assigned to the threshold (Θ). In other words, as stated previously, once the size of the Θ-sketch reaches the predetermined value of K, each update that inserts a new sample (i.e., new hash value) into the sketch, correspondingly also removes the largest sample in the sketch. The largest sample is assigned as the new threshold value Θ. Thereafter, the process loops back to step 410 to process the next data element of the input data stream.

Figure 5:
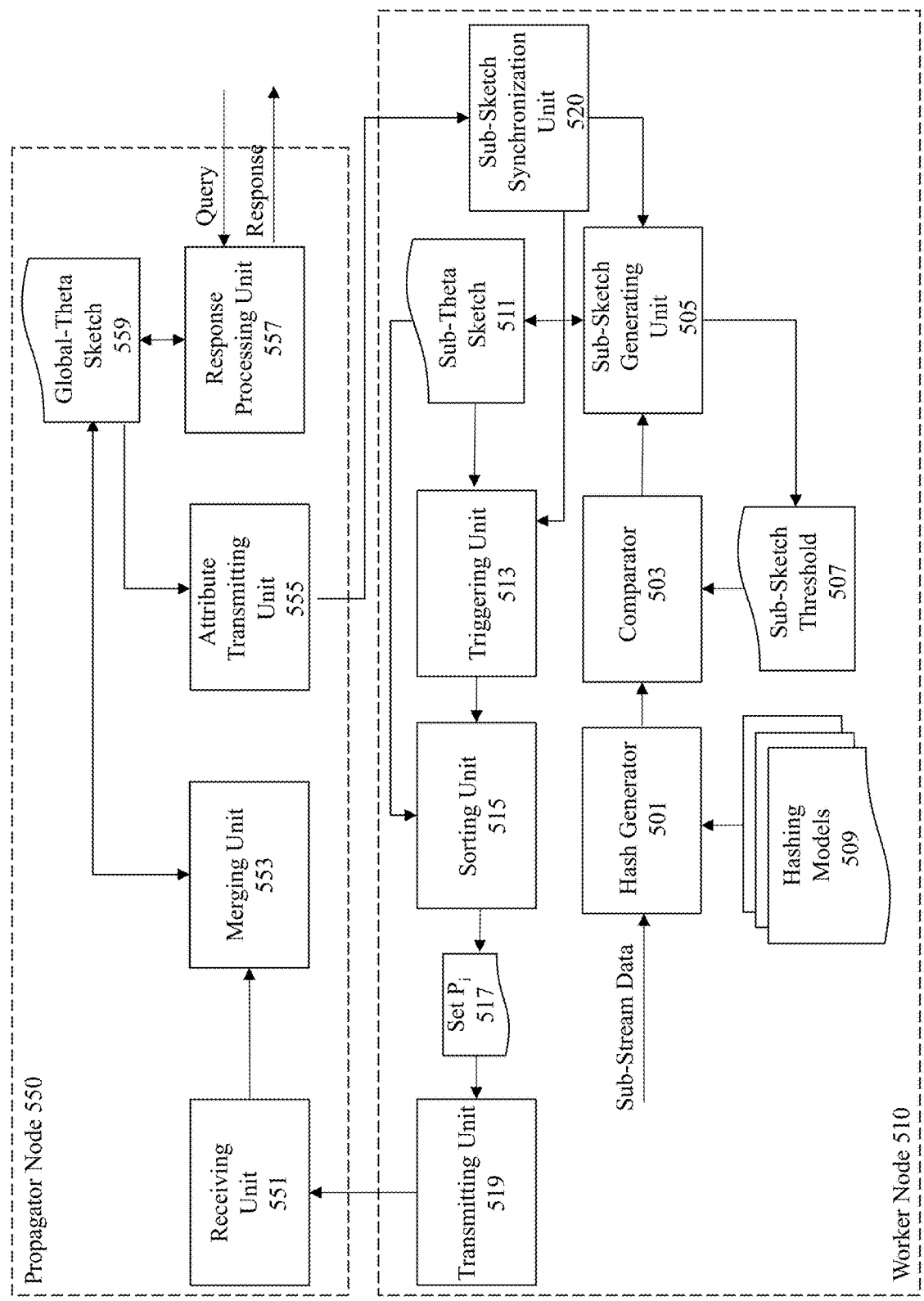
FIG. 5 depicts an exemplary high-level system diagram of a concurrent theta sketch generator, according to an embodiment of the present teaching.
Figure 6:
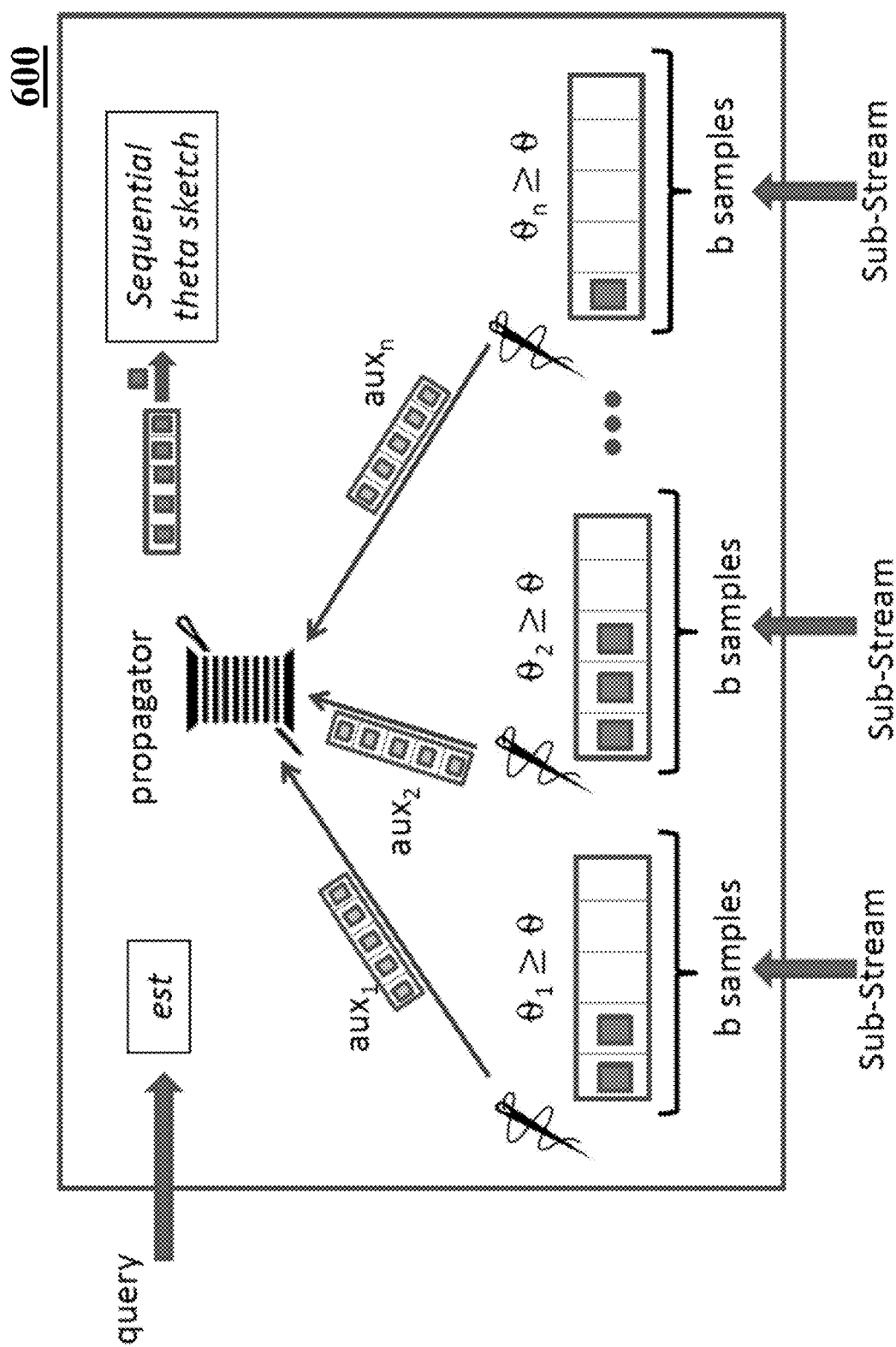
FIG. 6 is an exemplary schematic depicting operation of a concurrent theta sketch generator, according to an embodiment of the present teaching.

FIG. 5 depicts an exemplary high-level system diagram of a concurrent Θ-sketch generator according to an embodiment of the present teaching, and FIG. 6 is an exemplary schematic depicting operation of the concurrent Θ-sketch generator, according to an embodiment of the present teaching. The concurrent Θ-sketch generator uses multiple threads (i.e., worker nodes/threads) that each process respective data stream elements to generate a shared/global sketch. Specifically, the concurrent Θ-sketch generator includes a propagator thread (i.e., the propagator node) that generates a shared Θ-sketch (also referred to herein as a global Θ-sketch) based on the processed data stream elements of each individual worker thread.

The concurrent Θ-sketch generator as shown in FIG. 5 includes a propagator thread 550 and multiple worker threads 510. Note that for sake of clarity, FIG. 5 depicts only a single worker thread 510. However, the concurrent Θ-sketch generator includes multiple worker threads, each of which has a configuration similar to the worker thread 510. The worker thread 510 includes a hash generator 501, a comparator 503, a sub-sketch generating unit 505, a triggering unit 513, a sorting unit 515, a transmitting unit 519, and a sub-sketch synchronization unit 520. The propagator thread 550 includes a receiving unit 551, a merging unit 553, an attribute transmitting unit 555, and a response processing unit 557.

The worker thread 510 receives incoming data stream elements and generates the sub-Θ-sketch 511 in a sequential manner similar to that as described above with reference to FIG. 3. In other words, each of the worker threads 510 is a sequential Θ-sketch generator that processes respective data stream elements in a manner similar to that as described above with reference to FIG. 3. Specifically, the operation of units 501, 503, and 505 corresponds to the operation of units 310, 320, and 340 of FIG. 3, and thus a description of these units is not repeated here.

The triggering unit 513 determines whether a propagation condition associated with the sub Θ-sketch 511 is satisfied. For example, as shown in FIG. 6, the sub Θ-sketch associated with each of the worker threads is a fixed sized array of 'b' elements. By one embodiment, the triggering unit 513 determines whether the sub Θ-sketch is fully populated (i.e., the sub Θ-sketch includes 'b' elements whose respective hash values are lower than the threshold associated with the sub Θ-sketch).

According to one embodiment of the present teaching, each worker thread 510 synchronizes with the propagator thread 550 based on a synchronization parameter (P). The synchronization parameter is set by the propagator thread 550 and transmitted to the sub-sketch synchronization unit 520 of the worker thread 510. The triggering unit 513 determines whether the synchronization parameter satisfies a criterion. For example, the triggering unit 513 determines whether the synchronization parameter is greater than a predetermined value (e.g., P>0).

Upon detecting that the synchronization parameter satisfies the criterion, the triggering unit 513 activates the sorting unit 515 that is configured to generate an auxiliary array, which includes the elements of the sub Θ-sketch sorted in a predetermined fashion (e.g., ascending order). Thereafter, the worker thread 510 sets the value of the synchronization parameter to the predetermined value (e.g., P=0) 517 to indicate that the auxiliary array is ready to be propagated to the propagator thread 550 for further processing. Moreover, on detecting that the synchronization parameter satisfies the criterion, the sub-sketch generating unit 505 may utilize the value associated with the synchronization parameter to update the sub-sketch threshold 207 in a manner as described below.

The propagator thread 550 upon obtaining the auxiliary array (via the receiving unit 551) proceeds to further process the auxiliary array. Specifically, the merging unit 553 merges the elements included in the auxiliary array with the contents of the global Θ-sketch 559. It must be appreciated that the merging process is highly optimized as the merging unit 553 merges an already sorted array (i.e., the auxiliary array) with the global Θ-sketch 559. Accordingly, the merging unit 553 can stop merging upon encountering an element in the auxiliary array whose value is bigger than the threshold (global Θ) associated with the global Θ-sketch.

Upon completing the merging of the auxiliary array with the global Θ-sketch 559, it must be appreciated that the threshold associated with the global Θ-sketch 559 is also updated. Specifically, the updated value of the threshold corresponds to the value of the largest element that is removed from the global Θ-sketch.

Further, by one embodiment of the present teaching, upon concluding the merging process, the propagator thread 550 piggybacks the global Θ to the synchronization parameter (P), which is further adopted by the worker thread (via the sub-sketch synchronization unit 520). Thus, the worker thread 510 learns the value of the global Θ at no additional synchronization cost. Accordingly, a worker thread i, sets the value of its local threshold ($\theta_i$) to the value of the global Θ. As the global Θ is monotonically decreasing, periodically copying it into local copies (of the worker threads) maintains the invariant $\Theta_i \geq \Theta$, for all the worker threads as shown in FIG. 6. Thus, while each worker thread 510 may oversample the incoming data stream elements, the worker threads never fail to sample elements that need to be included in the global Θ-sketch.

As stated previously, the Θ-sketch can be utilized to address queries of the type "what are the number of unique elements in the data stream?". Such a query is received by the response processing unit 557 included in the propagator thread 550, which provides a response by diving the number of elements included in the global Θ-sketch by the global Θ threshold.

It must be appreciated that the implementation of the concurrent Θ-sketch is in no way limited to the specific configuration as depicted in FIG. 5. For instance, according to one embodiment of the present teaching, the worker thread 510 and the propagator thread 550 may not include any transmitting and/or receiving units, respectively. In this case, for instance, the propagator thread 550 may directly access the local memory of the worker threads 510 to propagate the local sketches for further processing.

Figure 7:
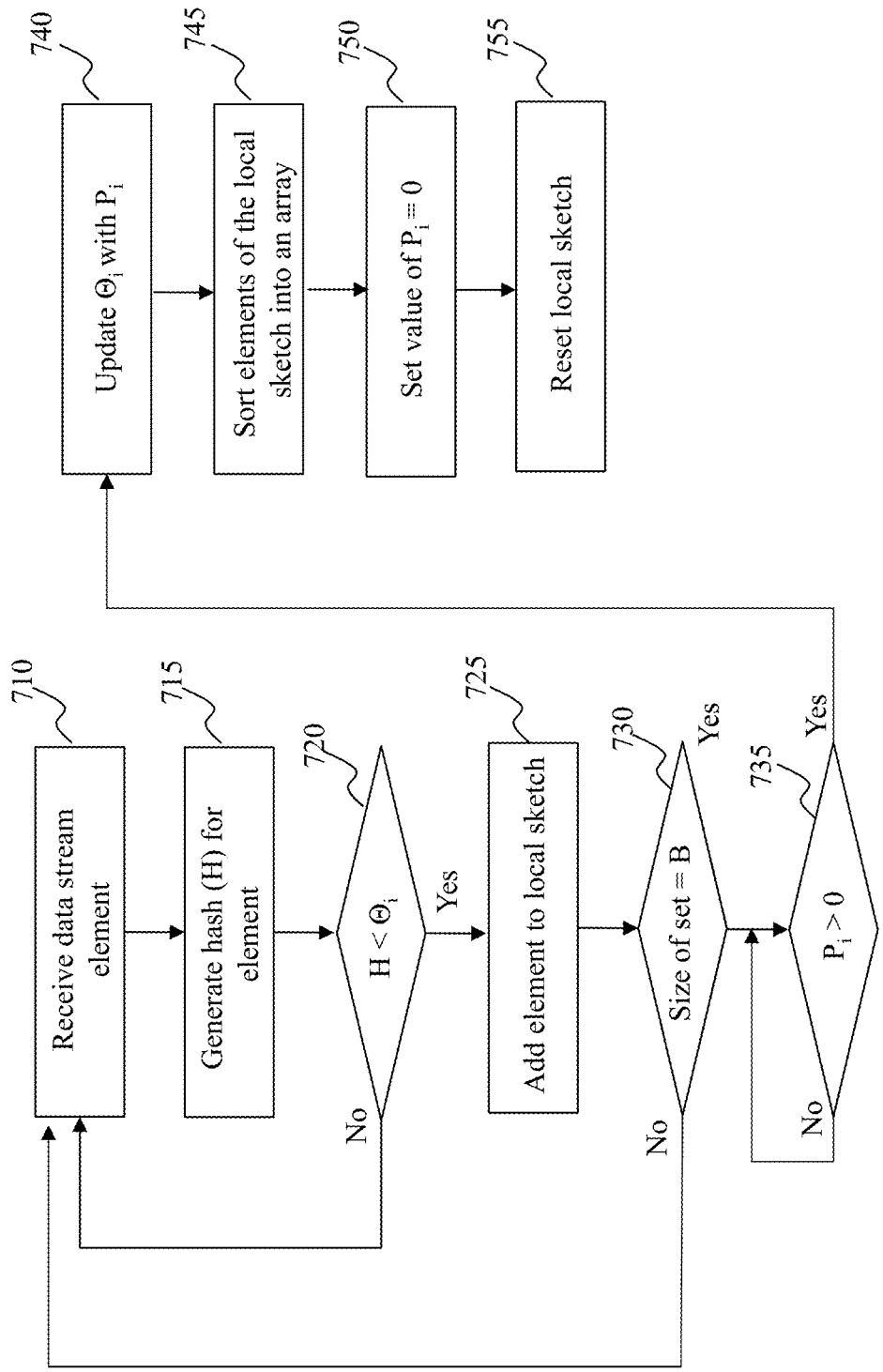
FIG. 7 is a flowchart of an exemplary process of a worker node of a concurrent theta sketch generator, according to an embodiment of the present teaching.

Turning now to FIG. 7, there is provided a flowchart of an exemplary process of a worker thread of a concurrent Θ-sketch generator, according to an embodiment of the present teaching. The process commences in step 710, wherein the worker thread receives a data element. In step 715, a hash is generated for the data element in accordance with a hashing model.

In step 720, a query is performed to determine whether the computed hash value of the data element is lower than a threshold associated with a local sketch of the worker thread. If the response to the query is negative, the process loops back to step 710 to process the next element of the data stream. However, if the response to the query is affirmative, the process moves to step 725.

In step 725, the hash value associated with the data element is added to the local Θ-sketch. The process then proceeds to step 730, wherein a query is performed to determine whether the local Θ-sketch satisfies a criterion. According to one embodiment, the criterion may correspond to determining whether the local Θ-sketch is fully populated i.e., number of samples included in the local Θ-sketch is equal to a predetermined number of elements which is equal to the size the local sketch. If the response to the query is negative, the process loops back to step 710.

However, if the response to the query in step 730 is affirmative, the process proceeds to step 735, wherein another query is performed to determine whether a value of a synchronization parameter (P) is greater than a predetermined threshold value. For example, it may be determined whether the synchronization parameter is greater than zero. If the response to the query is negative, the process enters a wait phase. In other words, the process waits until the value of the synchronization parameter is greater than the predetermined threshold value.

If the response to the query in step 735 is affirmative, the process moves to step 740, wherein the worker thread updates the value of the threshold associated with the local Θ-sketch. Specifically, the threshold associated with the local Θ-sketch is set to the value of the synchronization parameter. The process then moves to step 745, wherein the worker thread generates an auxiliary array, which includes elements of the local Θ-sketch sorted in a predetermined fashion e.g., ascending order.

Further, in step 750, the worker thread sets the value of the synchronization parameter to the predetermined threshold value (e.g. sets P=0) to indicate to the propagator thread that the auxiliary array is ready to be propagated. Further, in step 755, upon propagation of the auxiliary array, the worker thread resets the local sketch to process the next data elements in the data stream.

Figure 8:
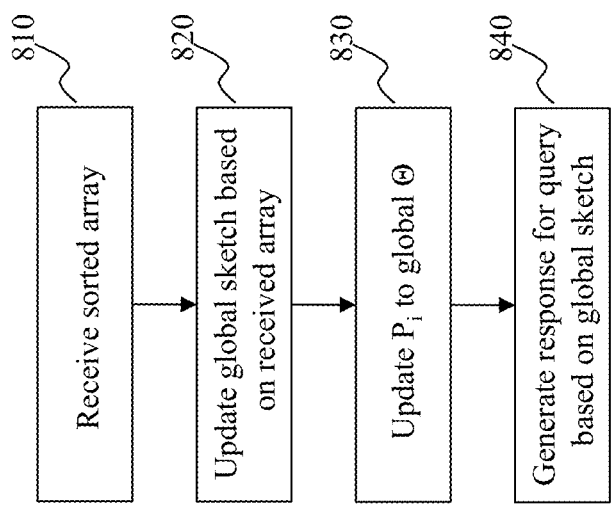
FIG. 8 is a flowchart of an exemplary process of a propagator node of a concurrent theta sketch generator, according to an embodiment of the present teaching.

FIG. 8 is a flowchart of an exemplary process of a propagator thread of a concurrent Θ-sketch generator, according to an embodiment of the present teaching. The process commences in step 810, wherein the propagator thread obtains the auxiliary array sorted by the worker thread.

In step 820, the propagator thread updates the global Θ-sketch based on obtained auxiliary array. Specifically, as described before, the propagator thread merges the contents of the auxiliary array with the global Θ-sketch until a stopping condition is satisfied.

Thereafter, the propagator thread updates the value of the synchronization parameter. Specifically, the synchronization parameter is assigned a value equal to the new threshold of the global Θ-sketch. Note that the updated value of the synchronization parameter is utilized by the worker thread as shown in step 740 of FIG. 7. The process then moves to step 840, wherein the propagator thread generates a response for a query based on the global Θ-sketch.

Figure 9A:
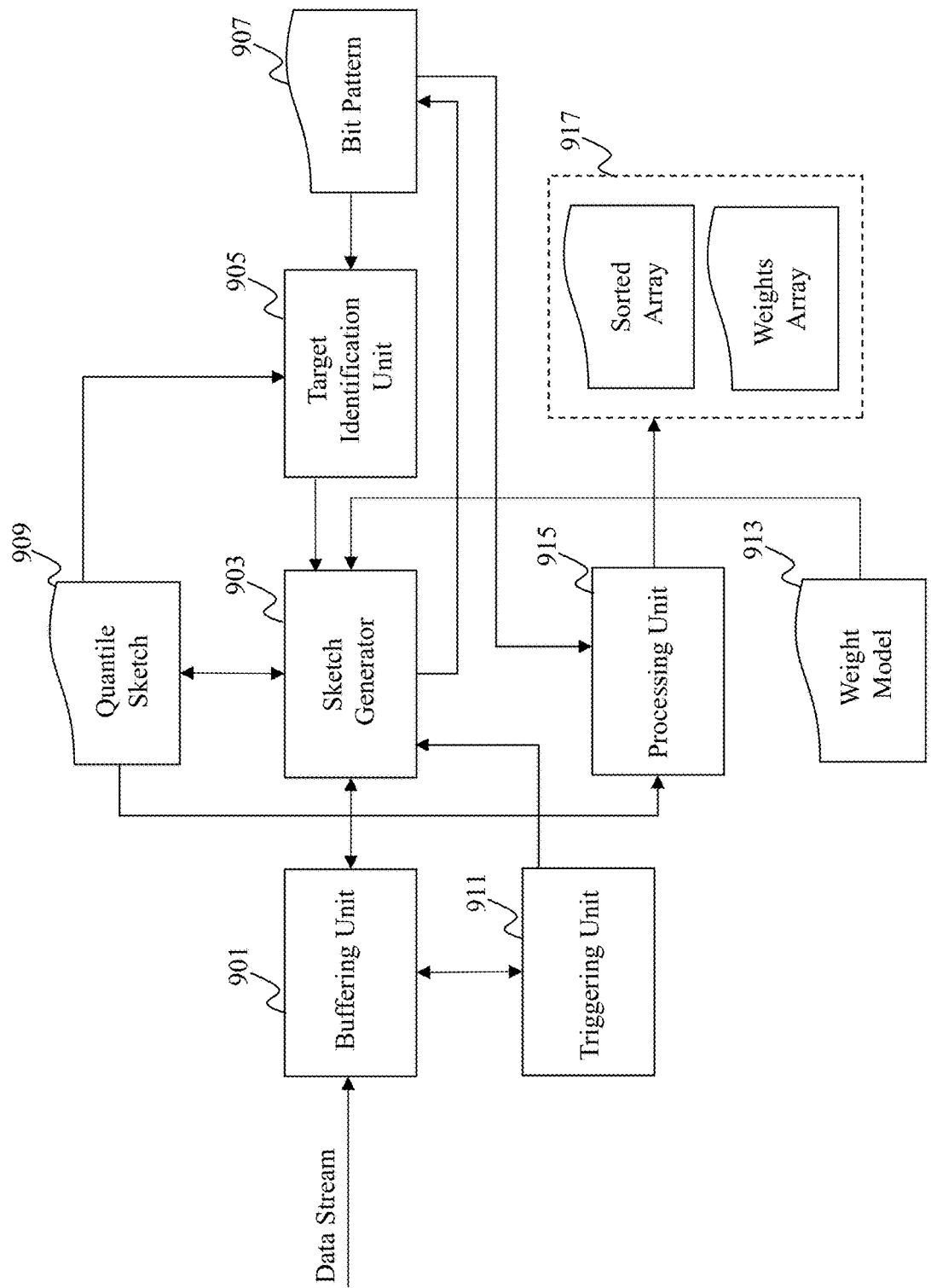
FIG. 9A depicts an exemplary high-level system diagram of a sequential quantile sketch generator, according to an embodiment of the present teaching.
Figure 9B:
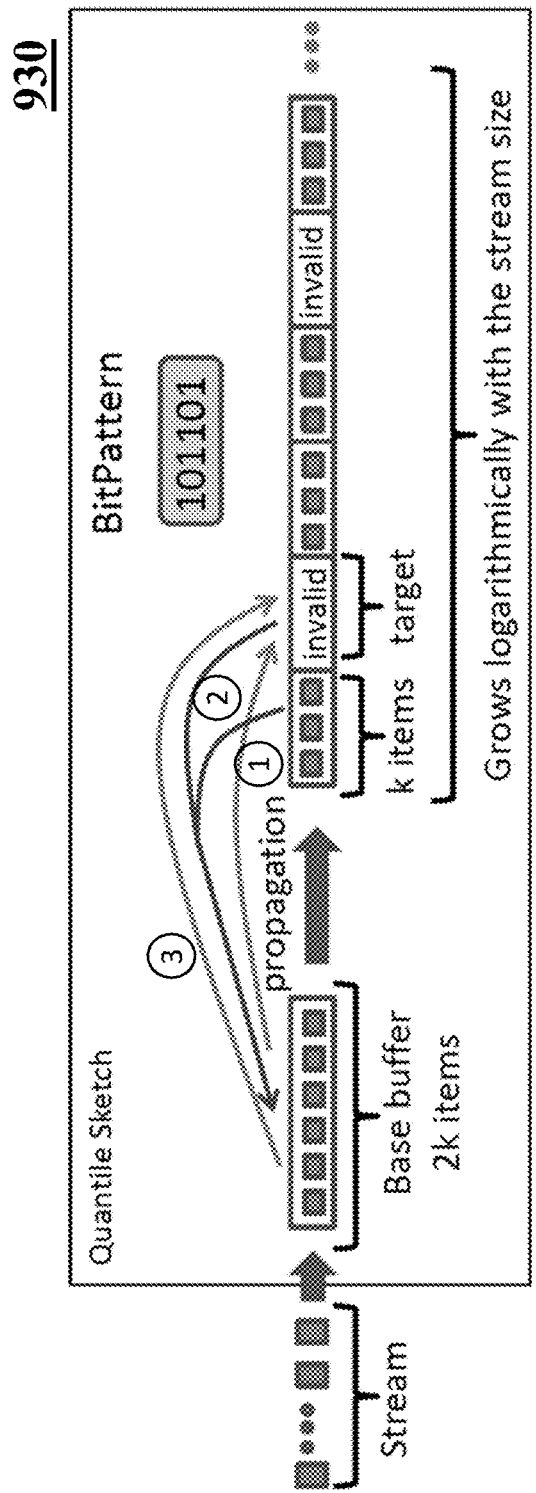
FIG. 9B is an exemplary schematic depicting generation of a sequential quantile sketch, according to an embodiment of the present teaching.

Turning now to FIG. 9A, there is depicted an exemplary high-level system diagram of a sequential quantile sketch generator, according to an embodiment of the present teaching. FIG. 9B is an exemplary schematic illustrating generation of the sequential quantile sketch according to an embodiment of the present teaching. Note that the quantile sketch may be generated to provide responses to queries such as 'what percentage of user sessions end within one minute?', or 'what is the median session time?'. In what follows, there is provided a detailed description of generation of a sequential quantile sketch with reference to FIGS. 9A and 9B.

Given a stream A of items from an ordered domain, for every $0<\varphi<1$, a $\varphi$-quantile of A is an item with rank, $\lfloor \varphi|A|\rfloor$, where the rank of item i is the number of elements in A smaller than i. An $\varepsilon$-approximate $\varphi$-quantile is an element with rank between $(\varphi-\varepsilon)|A|$ and $(\varphi+\varepsilon)|A|$. For every stream A, error $\varepsilon$, and probability $\delta$, a quantiles sketch produces a summary of A, which supports $\varepsilon$-approximate $\varphi$-quantile queries for every $0<\varphi<1$ namely, returning an element with rank between $(\varphi-\varepsilon)|A|$ and $(\varphi+\varepsilon)|A|$ with a probability of at least $1-\delta$.

According to an embodiment of the present teaching, the data structure associated with the quantile sketch is an array including multiple levels, wherein each level includes a predetermined number of elements (e.g., k elements per level). Each level is assigned a unique weight. The quantile sketch is generated based on a zipping operation. The zipping operation is defined herein as merging two sets S1 and S2, that each include k items, to a single set S of k items. The zipping operation is performed by first computing a sorted union of the sets S1 and S2, and then, with equal probability, retaining either the even numbered items or the odd numbered items to form the set S.

Referring to FIG. 9A, the sequential quantile sketch generator includes a buffering unit 901, a sketch generator 903, a target identification unit 905, a triggering unit 911, and a processing unit 915. The buffering unit 901 receives incoming data stream elements and buffers them in an array (referred to herein as a base buffer). By one embodiment, as shown in FIG. 9B, the base buffer is an array of size $2k$ elements. When the base buffer is filled with $2k$ elements from the data stream, the triggering unit 911 triggers the sketch generator 903 to propagate the 2k elements into the quantile sketch 909.

As stated previously, the quantile sketch 909 is an array including multiple levels (referred to herein as a levels array), wherein each level may be considered as a sub-array of size k that either contains k ordered items or is invalid. The sequential quantile sketch generator uses a bit-pattern variable 907 that indicates which levels (i.e. sub-arrays) of the quantile sketch are valid/invalid. For instance, a valid level may be represented by a '1' bit in the bit-pattern 907 and an invalid level may be represented by '0' bit in the bit-pattern 907. The propagation of the 2k elements from the buffering unit 901 to one of the levels of the quantile sketch is performed as follows.

The target identification unit 905 utilizes the bit-pattern variable 907 to determine a first invalid level in the quantile sketch. For example, the target identification unit 905 identifies the leftmost bit in the bit-pattern 907 that is '0' and assigns the corresponding level as a target level. The sketch generator 903 propagates the 2k elements included in the base buffer to the target level. The propagation includes the following three steps: (a) in step 1, the base buffer is sorted and zipped into the target level (this step is depicted by the arrow labeled 1 in FIG. 9B); (b) in step 2, for each level i=1 to the last level that precedes the target level, the contents of level i are merge-sorted with the content of what is currently stored in the target level into the base buffer (this step is depicted by the arrow labeled 2 in FIG. 9B); and finally, in step 3, the contents of the base buffer are zipped into the target level of the quantile sketch (this step is depicted by the arrow labeled 3 in FIG. 9B). Moreover, upon propagating the contents of the base buffer into the target level of the quantile sketch, the sketch generator 903 updates the bit-pattern 907 to indicate that the target level is now valid, while all the levels beneath it are invalid.

By one embodiment of the present teaching, the sketch generator 903 assigns a weight to each level of the quantile sketch. Specifically, each level is assigned a weight in accordance with a weight model 913. For example, the weight assigned to level i is $2^i$. It must be appreciated that the weight assigned to level i+1 is twice the weight of level i, as level i+1 is zipped an additional time as compared to level i, and thus represents twice the number of items represented by level i.

Further, in order to obtain a quantile, the processing unit 915 retrieves the quantile sketch 909 and the bit-pattern 907 and generates an auxiliary object 917 that includes two arrays: (1) a sorted array of items, which contains all the elements from all the valid levels of the quantiles sketch, and (2) an array of weights, referred to herein as a weight array that maps every item in the sorted array to its corresponding weight. By one embodiment, to obtain the $\varphi$-quantile, the processing unit 915 determines the first index (referred to herein by variable 'ind') in the weight array such that the sum of all weights in weight array till index ind is $\lfloor \varphi|A|\rfloor$. The $\varphi$-quantile is the element located at position ind in the sorted array.

Figure 10:
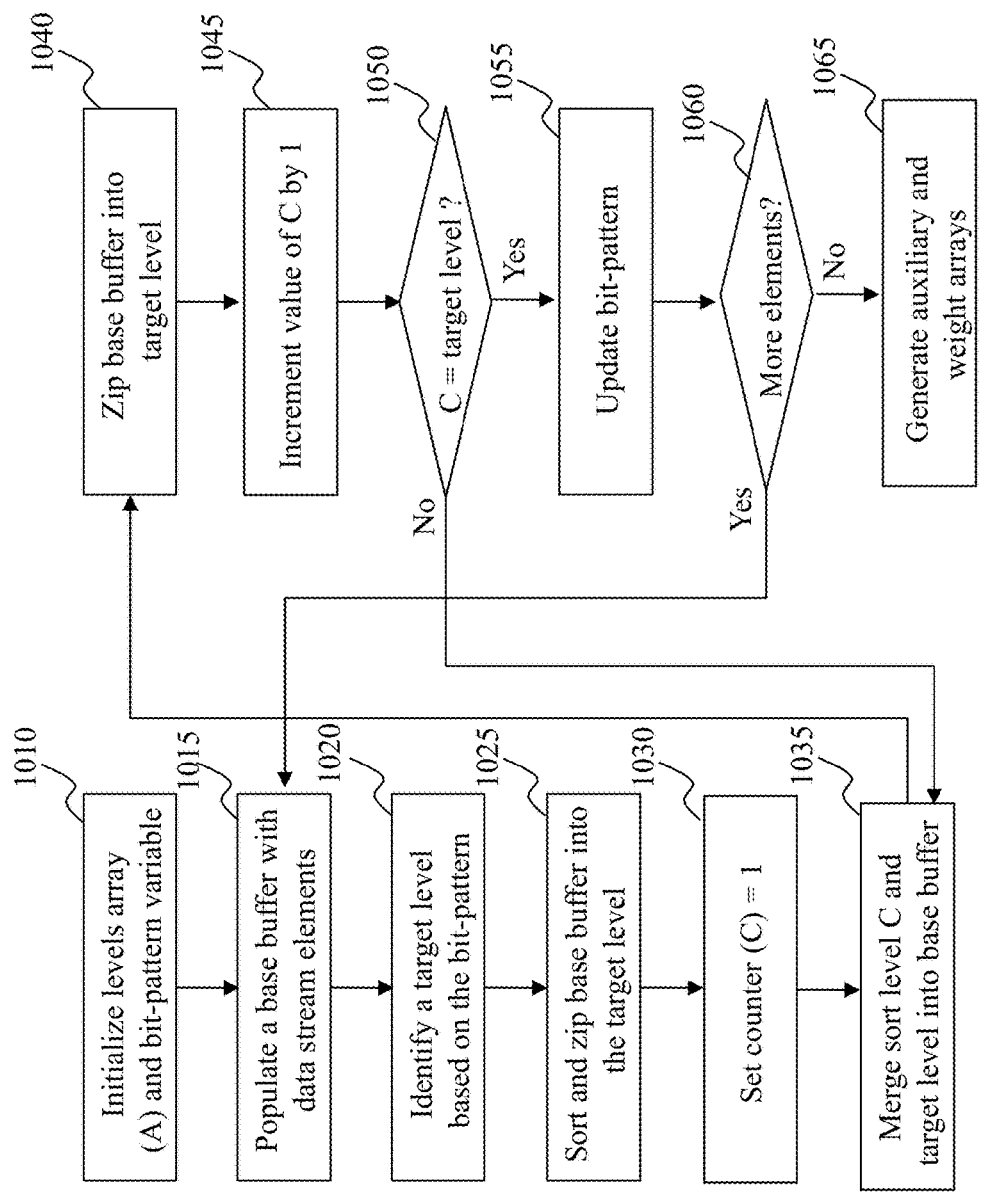
FIG. 10 is a flowchart of an exemplary process of a sequential quantile sketch generator, according to an embodiment of the present teaching.

FIG. 10 is a flowchart of an exemplary process of a sequential quantile sketch generator, according to an embodiment of the present teaching. The process commences in step 1010, wherein the quantile sketch and the bit-pattern variable are initialized. Specifically, all the bits in the bit pattern may be set to 0, and the sub-arrays (i.e., the levels of the quantile sketch) may be initialized to zero.

In step 1015, a base buffer is populated with elements from a data stream. In step 1020, a target level within the level array is identified based on the bit pattern. In step 1025, the contents of the base buffer are sorted and zipped into the target level The process then moves to step 1030, wherein a counter (C) is initialized to a value of one. In step 1035, content at level C in the levels array (i.e. the quantile sketch) is merge sorted with content in the target level of the level array. The merge sorted content is stored in the base buffer. Further, in step 1040, a zipping process as described previously is performed on the content of the base buffer, and the result is stored into the target level of the levels array. The process then moves to step 1045, wherein the counter value is incremented by one.

Upon incrementing the counter value, in step 1050, a query is performed to determine whether counter C corresponds to the target level. If the response to the query is affirmative, then the process moves to step 1055. If the response to the query is negative, the process loops back to repeat steps 1035, 1040, and 1045.

The process in step 1055 updates the bit-pattern (by setting the bit corresponding to the target level to 1), to indicate that the target level is valid, while all the levels beneath it are invalid. Thereafter, the process moves to step 1060, wherein a query is performed to determine whether there are more elements in the data stream that need to be processed. If the response to the query is affirmative, the process loops back to step 1015, else the process moves to step 1065. In step 1065, the quantile sketch generator generates auxiliary objects (i.e., the sorted array and weight array) that may be used to generate a response to a quantile query.

Figure 11:
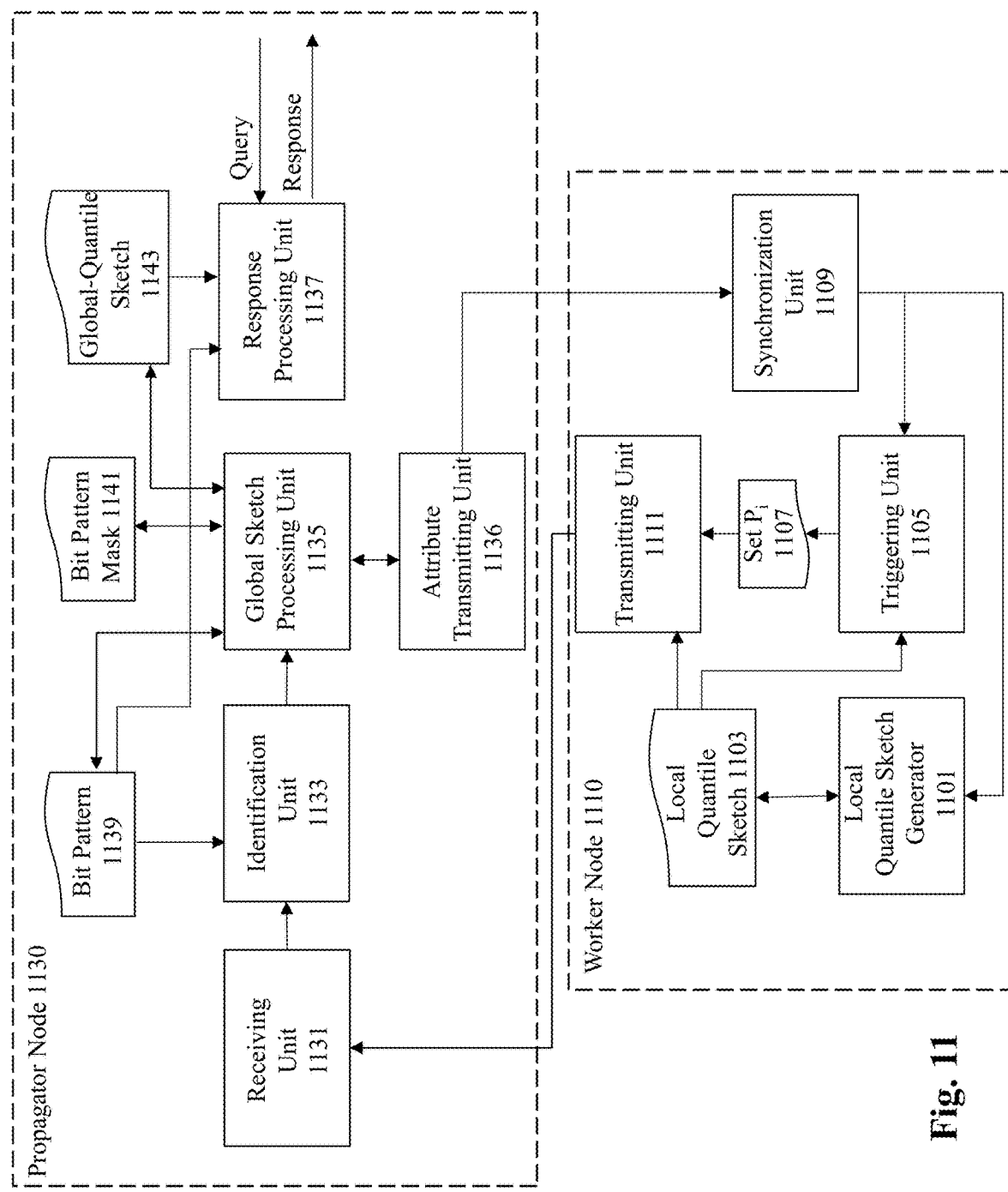
FIG. 11 depicts an exemplary high-level system diagram of a concurrent quantile sketch generator, according to an embodiment of the present teaching.
Figure 12:
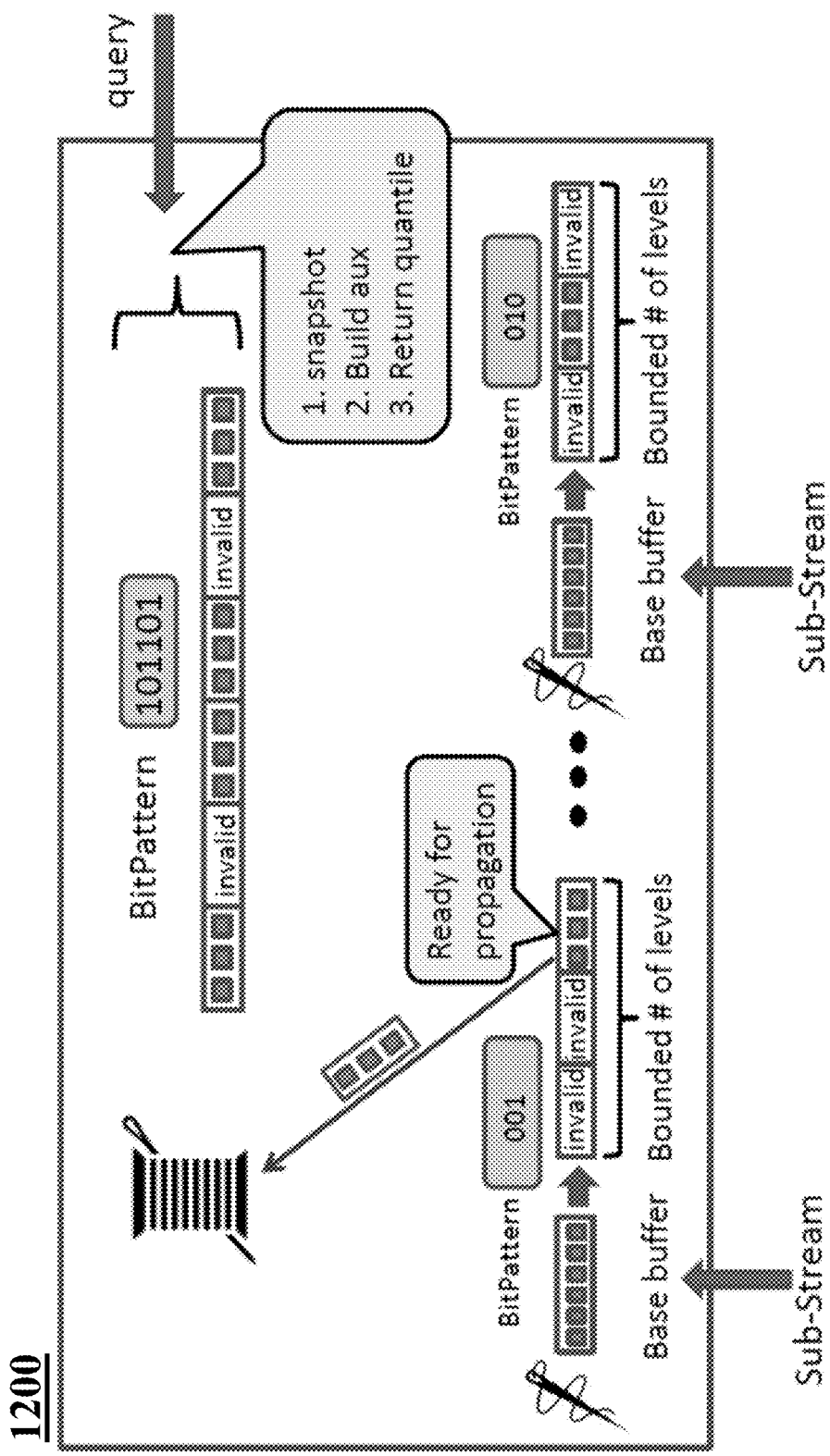
FIG. 12 is an exemplary schematic depicting operation of a concurrent quantile sketch generator, according to an embodiment of the present teaching.

FIG. 11 depicts an exemplary high-level system diagram of a concurrent quantile sketch generator according to an embodiment of the present teaching, and FIG. 12 is an exemplary schematic depicting operation of the concurrent quantile sketch generator, according to an embodiment of the present teaching. The concurrent quantile sketch generator uses multiple threads that each process respective data stream elements to generate a shared quantile sketch. Specifically, the concurrent quantile sketch generator includes a propagator thread that generates a shared quantile sketch (also referred to herein as a global quantile sketch) based on the processed data stream elements of each individual worker thread.

The concurrent quantile sketch generator as depicted in FIG. 11 includes a propagator thread 1130 and multiple worker threads 1110. Note that for sake of clarity, FIG. 11 depicts only a single worker thread 1110. However, the concurrent quantile sketch generator includes multiple worker threads, each of which has a configuration similar to the worker thread 1110. The worker thread 1110 includes a local quantile sketch generator 1101, a triggering unit 1105, a transmitting unit 1111, and a synchronization unit 1109. The propagator thread 550 includes a receiving unit 1131, an identifying unit 1133, a global sketch processing unit 1135, an attribute transmitting unit 1136, and a response processing unit 1137.

As stated previously with respect to FIG. 9B, the sequential quantile sketch generator propagates 2k elements from the base buffer to the target buffer. In contrast, the concurrent quantile sketch generator propagates 24 elements, wherein $L \geq 0$ is a parameter that impacts accuracy. Accordingly, the concurrent quantile sketch generator amortizes the propagation cost and increase throughput. Specifically, the concurrent quantile sketch generator exploits locality and minimizes synchronization between a single propagator thread and many worker threads. Every worker thread maintains a local sketch with a bounded number of levels (L), wherein each level stores k items. Each time the local quantile sketch fills its last level (i.e., level L), the content of this level is propagated to the shared quantile sketch by the propagator thread.

The triggering unit 1105 determines whether a propagation condition associated with the local quantile sketch 1103 is satisfied. As stated previously, each worker thread maintains the local quantile sketch that includes a bounded number of levels. For example, as shown in FIG. 12, the local quantile sketch associated with each worker thread includes a bounded number of levels. By one embodiment, the propagation condition associated with the local quantile sketch corresponds to the triggering unit 1105 determining whether the last level (i.e., level L) is populated.

According to one embodiment of the present teaching, each worker thread 1110 synchronizes with the propagator thread 1130 based on a synchronization parameter (P). The synchronization parameter is set by the propagator thread 1130 (e.g. P=1) and utilized by the worker thread 1110 as described below. The synchronization unit 1109 included in the worker thread 1110 obtains the set value of the synchronization parameter. The triggering unit 1105 determines whether the synchronization parameter satisfies a criterion. For example, the triggering unit 1105 determines whether the synchronization parameter is greater than a predetermined value (e.g., P>0).

Upon detecting that the synchronization parameter satisfies the criterion, the local quantile sketch generator 1101 generates an auxiliary array, which includes the elements of the last level of the local quantile sketch 1103. Thereafter, the triggering unit 1105 sets the value of the synchronization parameter to the predetermined value (i.e., P=0) 1107 to indicate that the auxiliary array is ready to be propagated to the propagator thread 1130 for further processing.

The propagator thread 1130 upon obtaining the auxiliary array (via the receiving unit 1131) proceeds to further process the auxiliary array. Specifically, the global sketch processing unit 1135 merges the contents of the auxiliary array with the global quantile sketch 1143 in a manner as described below.

Similar to the sequential quantile sketch of FIG. 9B, the global quantile sketch of the concurrent quantile sketch generator is an array including multiple levels, wherein each level may be considered as a sub-array of size k that either contains k ordered items or is invalid. The global quantile sketch generator uses a bit-pattern variable 1139 that indicates which levels (i.e. sub-arrays) of the global quantile sketch are valid or invalid. For instance, a valid level may be represented by a '1' bit in the bit-pattern 1139 and an invalid level may be represented by '0' bit in the bit-pattern 1139. The identification unit 1133 utilizes the bit-pattern variable 1139 to determine a target level in the global quantile sketch. For instance, by one embodiment, the identification unit 1133 identifies the leftmost bit in the bit-pattern 1139 that is '0' and assigns the corresponding level in the global quantile sketch as the target level.

The global sketch processing unit 1135 propagates the contents of the auxiliary array received from the worker node by the following steps: (a) the contents of the auxiliary array are copied to a temporary array (referred to herein as temp array); (b) the value of the synchronization parameter P is set to one (i.e., a value greater than the predetermined threshold value associated with the synchronization parameter); (c) a bit pattern mask is initialized with all bits set to zero; (d) for each level i=L to the target level −1: (d1) the contents of level i are merge-sorted with the contents of the temp array, and the result of the merge sort is stored in another temporary array referred to herein as temp array 1, (d2) the contents of temp array 1 are zipped to the temp array, and (d3) bit at location i is set to 1 in the bit pattern mask.

The process further continues in step (e) where the contents of the temp array are stored in the target location in the global sketch; (f) the bit corresponding to the target location is set to 1 in the bit pattern mask; and (g) the bit-pattern 1139 is updated by performing an XOR operation of the bit pattern and the bit pattern mask. Moreover, the value of parameter N, which corresponds to the total number of elements processed thus far is updated as $N=N+k \cdot 2^L$. Thus, according to above described process, the bit pattern is updated to indicate that the target level (upon propagation and processing of the auxiliary array) is valid, while all the levels beneath it are invalid.

Upon completion of the propagation of the auxiliary array with the global quantile sketch 1143, the attribute transmitting unit 1136 transmits the synchronization parameter to the synchronization unit 1109 included in the worker thread 1110, which utilizes the synchronization parameter to process the next elements of the data stream.

The global quantile sketch can be utilized to address queries of the type what percentage of user sessions end within one minute?' or 'what is the median session time?'. As shown in FIG. 12, such a query is received by the response processing unit 1137 included in the propagator thread 1130, which provides a response by generating auxiliary objects (i.e., the sorted array and weight array) as described previously with reference to FIGS. 9A and 9B. Note that in the case of the concurrent quantile sketch generator, the sorted array and the weight array are generated based on the global quantile sketch 1143 and the bit pattern 1139.

In order to be able to read concurrently with the propagation of the local sketches, the response processing unit 1137 obtains a consistent snapshot of the global quantile sketch 1143. Since the bit-pattern 1139 is an atomic variable, a propagation is visible to the response processing unit 1137 after it is updated. Thus, in order to obtain a snapshot, the response processing unit 1137 repeatedly reads the bit-pattern 1139, the global sketch, and then again the bit-pattern 1139. If the bit pattern did not change between the two read operations, it must be appreciated that the response processing unit 1137 has a consistent view. Otherwise, the response processing unit repeats the read operations described above. In parallel, during the propagation process, the propagator thread 1130 may read many levels, but writes only to the target level of the global sketch. Therefore, the response processing unit 1137 can be sure that the valid levels it reads between two identical read operations of the bit pattern 1139 are consistent.

Furthermore, similar to the concurrent Θ-sketch described previously, it must be appreciated that the implementation of the concurrent quantile sketch is in no way limited to the specific configuration as depicted in FIG. 11. For instance, according to one embodiment of the present teaching, the worker thread 1110 and the propagator thread 1130 may not include any transmitting and/or receiving units, respectively. In this case, for instance, the propagator thread 1130 may directly access the local memory of the worker thread 1110 to propagate the local quantile sketch for further processing. In a similar manner, the worker thread may directly access the value of the synchronization parameter set by the propagator thread.

Figure 13:
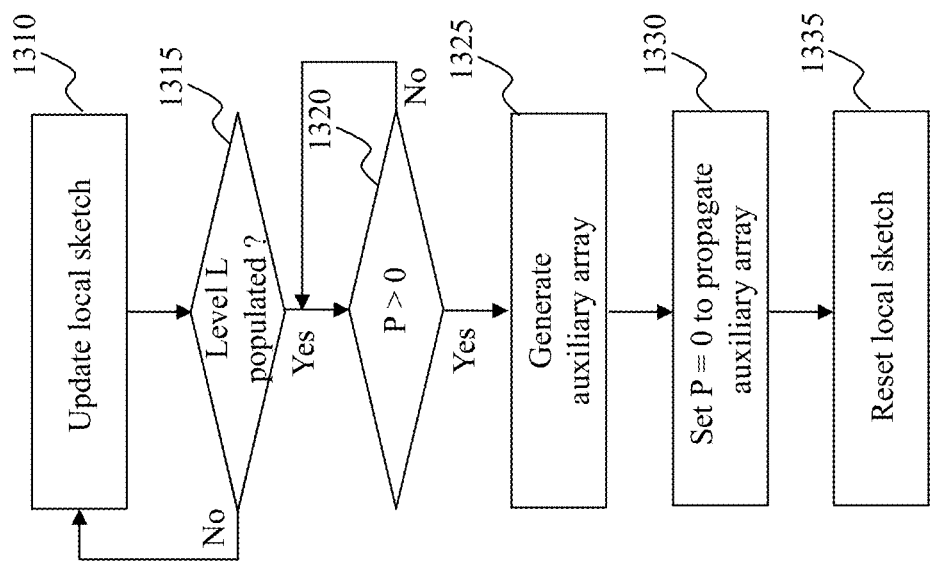
FIG. 13 is a flowchart of an exemplary process of a worker thread of a concurrent quantile sketch generator, according to an embodiment of the present teaching.

FIG. 13 is a flowchart of an exemplary process of a worker thread of a concurrent quantile sketch generator, according to an embodiment of the present teaching. The process commences in step 1310, wherein the worker thread updated the local quantile sketch based on data elements included in the sub-stream data. Note that the worker thread updates the local quantile sketch in a manner similar to the sequential quantile sketch generation as described with reference to FIG. 10.

The process then moves to step 1315, wherein a query is made to determine whether the last level (i.e., level L) of the local quantile sketch is populated. If the response to the query is negative, the process loops back to step 1310 and continues updating the local quantile sketch. If the response to the query is affirmative, the process moves to step 1320.

In step 1320, a further query is made to determine whether a synchronization parameter (P) is greater than a predetermined value. For example, the worker thread performs a query to determine whether parameter P is greater than zero (i.e., the predetermined value). If the response to the query is negative, the process enters a wait period. In other words, the process waits until the value of the synchronization parameter is greater than the predetermined threshold value. Note that the synchronization parameter is set to a value greater than the threshold value by the propagator thread. Thus, the worker thread essentially waits for the propagator thread to set the value of the synchronization parameter greater than the threshold value.

However, if the response to the query in step 1320 is affirmative, the process moves to step 1325, wherein the worker thread generates an auxiliary array which contains the elements included in the last level of the local quantile sketch. Thereafter, the process moves to step 1330, wherein the worker thread sets the value of the synchronization parameter to the predetermined threshold value (i.e. sets P=0). Note that the setting of the synchronization parameter to zero indicates to the propagator thread that the auxiliary array is ready to be propagated. Further, in step 1335, upon propagation of the auxiliary array, the worker thread resets the local quantile sketch to process the next data elements of the data sub-stream.

Figure 14:
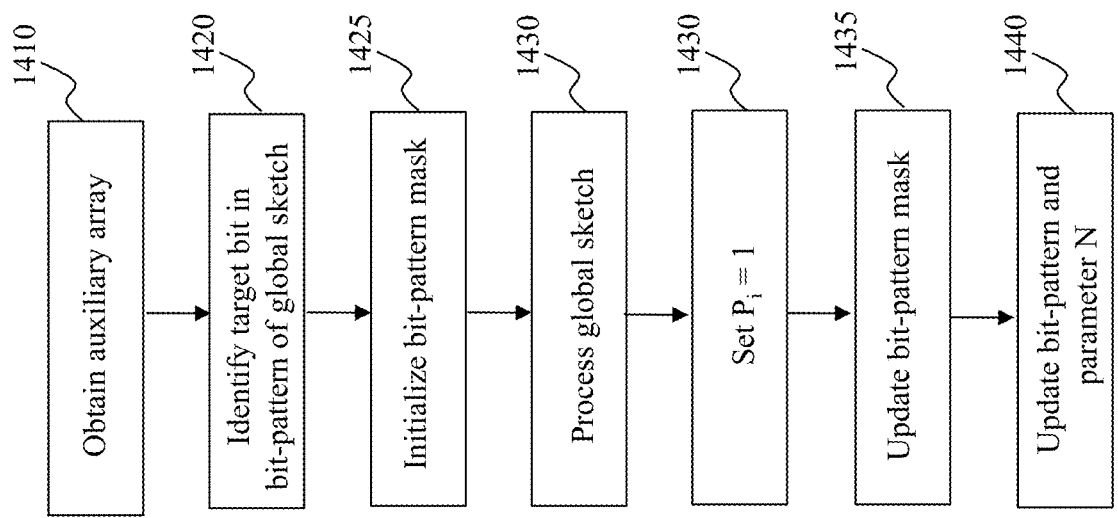
FIG. 14 is a flowchart of an exemplary process of a propagator thread of a concurrent quantile sketch generator, according to an embodiment of the present teaching.

FIG. 14 is a flowchart of an exemplary process of a propagator thread of a concurrent quantile sketch generator, according to an embodiment of the present teaching. The process commences in step 1410, wherein the propagator thread obtains the auxiliary array from the worker thread.

The process then moves to step 1420, wherein a target bit (and correspondingly a target level) is identified from the bit-pattern associated with the global quantile sketch. The process in step 1425 initializes a bit pattern mask. Thereafter, the process in step 1430 updates the global sketch based on the obtained auxiliary array (in step 1410) in a manner as described previously. Upon updating the global quantile sketch, the process in step 1430 sets the value of the synchronization parameter greater than a predetermined threshold value. For instance, the propagator thread sets the value of the synchronization parameter to one.

The process then moves to step 1435, wherein the propagator thread updates the bit pattern mask. Specifically, the propagator thread sets the bit in the bit pattern mask corresponding to the target level to one. Thereafter, in step 1440, the propagator thread updates the bit pattern and parameter N, which corresponds to the number of data items processed.

Figure 15:
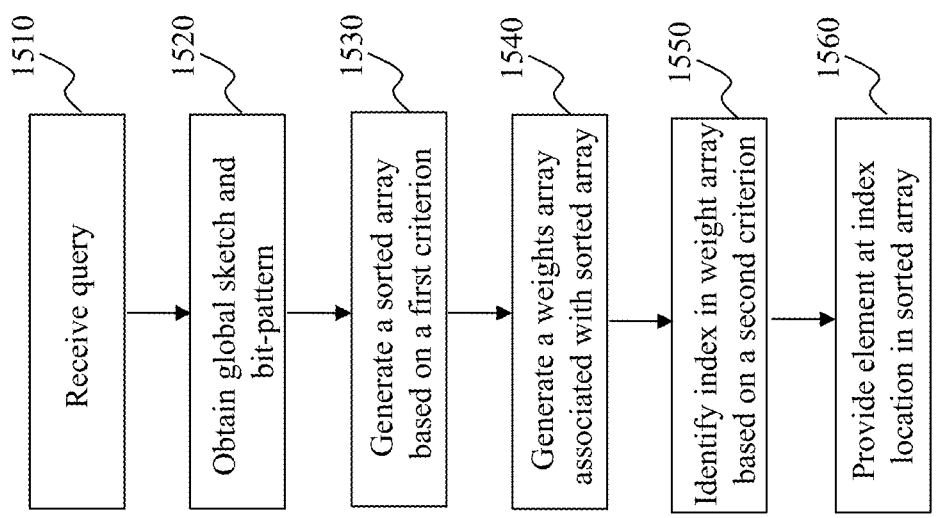
FIG. 15 is a flowchart of an exemplary process of a propagator thread of a concurrent quantile sketch generator in providing a response to a query, according to an embodiment of the present teaching.

Turning now to FIG. 15, there is depicted a flowchart of an exemplary process of a propagator thread of a concurrent quantile sketch generator in providing a response to a query, according to an embodiment of the present teaching. The process commences in step 1510 wherein a response processing unit of a propagator thread receives a query. Note that as stated previously, with regard to the concurrent quantile sketch, the query may be of type 'what percentage of user sessions end within one minute?' or 'what is the median session time?'.

The process then moves to step 1520, wherein the response processing unit obtains the global quantile sketch and the bit pattern. In order to generate a response to the received query, the response processing unit generates a sorted array in step 1530. The sorted array is generated based on a first criterion. Specifically, the sorted array is generated to include all the data elements from valid levels of the global quantile sketch sorted in a predetermined fashion e.g., ascending order.

Further, in step 1540, the process generates a weights array associated with the sorted array. Specifically, the weights array maps every item in the sorted array to its corresponding weight. Upon generating the sorted array and the weights array, the process in step 1550 identifies an index of the weight array based on a second criterion. Specifically, the process identifies the index such that the sum of all weights in weights array till the index is $\lfloor \varphi \,|N| \rfloor$ (or alternatively $|N-1|$, if $|N-1|$ is lower than $\varphi \cdot |N|$). Further, in step 1560, the process returns the element stored at location index in the sorted array as a response to the received query.

Figure 16:
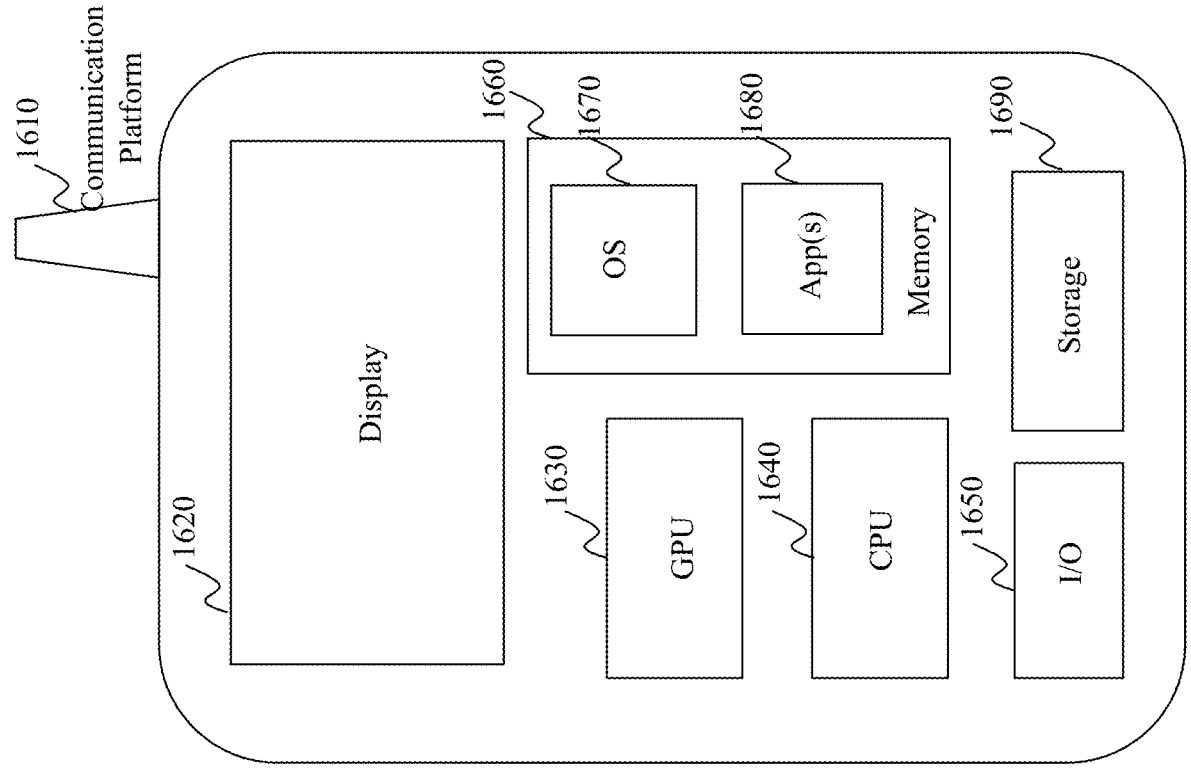
FIG. 16 depicts an architecture of a mobile device which can be used to implement a specialized system incorporating the present teaching.

Turning now to FIG. 16, there is depicted an architecture of a mobile device 1600, which can be used to realize a specialized system implementing the present teaching. In this example, a user device on which the functionalities of the various embodiments described herein can be implemented is a mobile device 1600, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1600 in this example includes one or more central processing units (CPUs) 1640, one or more graphic processing units (GPUs) 1630, a display 1620, a memory 1660, a communication platform 1610, such as a wireless communication module, storage 1690, and one or more input/output (I/O) devices 1650. Any other suitable component, including but not limited to a system bus or a controller (not shown), may also be included in the mobile device 1600. As shown in FIG. 16, a mobile operating system 1670, e.g., iOS, Android, Windows Phone, etc., and one or more applications 1680 may be loaded into the memory 1660 from the storage 1690 in order to be executed by the CPU 1640. The applications 1680 may include a browser or any other suitable mobile apps for performing the various functionalities on the mobile device 1600. User interactions with the content displayed on the display panel 1620 may be achieved via the I/O devices 1650.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 17 is an illustrative diagram of an exemplary computer system architecture, in accordance with various embodiments of the present teaching. Such a specialized system incorporating the present teaching has a functional block diagram illustration of a hardware platform which includes user interface elements. Computer 1700 may be a general-purpose computer or a special purpose computer. Both can be used to implement a specialized system for the present teaching. Computer 1700 may be used to implement any component(s) described herein. For example, the present teaching may be implemented on a computer such as computer 1700 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1700, for example, may include communication ports 1750 connected to and from a network connected thereto to facilitate data communications. Computer 1700 also includes a central processing unit (CPU) 1720, in the form of one or more processors, for executing program instructions. The exemplary computer platform may also include an internal communication bus 1710, program storage and data storage of different forms (e.g., disk 1770, read only memory (ROM) 1730, or random access memory (RAM) 1740), for various data files to be processed and/or communicated by computer 1700, as well as possibly program instructions to be executed by CPU 1720. Computer 1700 may also include an I/O component 1760 supporting input/output flows between the computer and other components therein such as user interface elements 1780. Computer 1700 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the analytics engine into the hardware platform(s) of a computing environment or other system implementing a computing environment or similar functionalities in connection with analyzing data. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the analytics engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for generating a data sketch, the method comprising:
generating, by a worker node on-the-fly, a local data sketch based on an online data stream;
in response the local data sketch including a predetermined number of data elements having hash values lower than a threshold value, determining, by the worker node, that a value of a synchronization parameter is set by a propagator node to a first bit value from a second bit value different from the first bit value, wherein the first bit value indicates completion of updating the data sketch with a previous local data sketch;
in response to the value of the synchronization parameter being set to the first bit value by the propagator node, sorting, by the worker node, data elements included in the local data sketch until the local data sketch is ready to be propagated, and
upon the local data sketch being ready to be propagated, setting, by the worker node, the synchronization parameter from the first bit value back to the second bit value, wherein the second bit value indicates that the local data sketch is ready to be propagated to the propagator node for updating the data sketch with the local data sketch;
propagating the local data sketch to the propagator node; and
repeating, by the worker node, the steps of generating, determining, sorting processing, setting, and propagating, to continue to process additional data elements of the online data stream following the processed data elements of the online data stream, until no data elements need to be processed in the online data stream.

2. The method of claim 1, wherein the local data sketch is propagated via access to a local memory of the worker node.

3. The method of claim 1, wherein the first bit value is 1, and the second bit value is 0.

4. The method of claim 1, wherein the step of sorting further comprises:
sorting the predetermined number of data elements; and
generating an auxiliary array including the sorted data elements.

5. The method of claim 1, wherein the local data sketch is a theta sketch and the step of generating further comprises:
computing the hash values for the predetermined number of data elements of the online data stream; and
inserting the hash values in the theta sketch based on the hash values being lower than the threshold value associated with the theta sketch.

6. The method of claim 5, further comprising:
obtaining an updated value of the synchronization parameter; and
updating the threshold value associated with the theta sketch to correspond to the updated value of the synchronization parameter.

7. The method of claim 1, wherein the local data sketch is a quantile sketch, the quantile sketch being an array having multiple levels, each level being configured to hold a fixed number of data elements, and wherein the condition further corresponds to a last level of the array being populated.

8. A non-transitory computer readable medium including computer executable instructions, wherein the instructions, when executed by a local node, cause the local node to perform a method for generating a data sketch, the method comprising:
generating on-the-fly a local data sketch based on an online data stream;
in response to the local data sketch including a predetermined number of data elements having hash values lower than a threshold value, determining that a first value of a synchronization parameter is set by a propagator node to a first bit value from a second bit value different from the first bit value, wherein the first bit value indicates completion of updating the data sketch with a previous local data sketch;

in response to the value of the synchronization parameter being set to the first bit value by the propagator node, sorting data elements included in the local data sketch until the local data sketch is ready to be propagated;

upon the local data sketch being ready to be propagated, setting the synchronization parameter from the first bit value back to the second bit value, wherein the second bit value indicates that the local data sketch is ready to be propagated to the propagator node for updating the data sketch with the local data sketch;

propagating the local data sketch to the propagator node; and repeating the steps of generating, determining, sorting setting, and propagating, to continue to process additional data elements of the online data stream following the processed data elements of the online data stream, until no data elements need to be processed in the online data stream.

9. The medium of claim 8, wherein the local data sketch is propagated via access to a local memory of the local node.

10. The medium of claim 8, wherein the first bit value is 1, and the second bit value is 0.

11. The medium of claim 8, wherein the step of sorting further comprises:

sorting the predetermined number of data elements; and
generating an auxiliary array including the sorted data elements.

12. The medium of claim 8, wherein the local data sketch is a theta sketch and the step of generating further comprises:

computing the hash values for the predetermined number of data elements of the online data stream; and
inserting the hash values in the theta sketch based on the hash values being lower than the threshold value associated with the theta sketch.

13. The medium of claim 12, further comprising:
obtaining an updated value of the synchronization parameter; and
updating the threshold value associated with the theta sketch to correspond to the updated value of the synchronization parameter.

14. The medium of claim 8, wherein the local data sketch is a quantile sketch, the quantile sketch being an array having multiple levels, each level being configured to hold a fixed number of data elements, and wherein the condition further corresponds to a last level of the array being populated.

15. A system having at least one processor, storage, and a communication platform capable of connecting to a network for generating a data sketch, the system comprising:

a local sketch generator of a worker node, implemented by the at least one processor, configured for generating on-the-fly a local data sketch based on an online data stream;

a triggering unit of the worker node, implemented by the at least one processor, configured for in response the local data sketch including a predetermined number of data elements having hash values lower than a threshold value, determining that a value of a synchronization parameter is set by a propagator node to a first bit value from a second bit value different from the first bit value, wherein the first bit value indicates completion of updating the data sketch with a previous local data sketch;

a processing unit of the worker node, implemented by the at least one processor, configured for in response to the value of the synchronization parameter being set to the first bit value by the propagator node, sorting data elements included in the local data sketch until the local data sketch is ready to be propagated;

a parameter setting unit of the worker node, implemented by the at least one processor, configured for in response to the value of the synchronization parameter being set to the first bit value by the propagator node, and upon the local data sketch being ready to be propagated, setting the synchronization parameter from the first bit value back to the second bit value, wherein the second bit value indicates that the local data sketch is ready to be propagated to the propagator node for updating the data sketch with the local data sketch; and a synchronization unit of the worker node, implemented by the at least one processor, configured for:
propagating the local data sketch to the propagator node, and
initiating a repetition of the generating, determining, sorting, setting, and propagating, to continue to process additional data elements of the online data stream following the processed data elements of the online data stream, until no data elements need to be processed in the online data stream.

16. The system of claim 15, wherein the local data sketch is propagated via access to a local memory of the worker node.

17. The system of claim 15, wherein the first bit value is 1, and the second bit value is 0.

18. The system of claim 15, wherein the processing unit is further configured for:
sorting the predetermined number of data elements; and
generating an auxiliary array including the sorted data elements.

19. The system of claim 15, wherein the local data sketch is a theta sketch and the local sketch generator is further configured for:
computing the hash values for the predetermined number of data elements of the online data stream; and
inserting the hash values in the theta sketch based on the hash values being lower than the threshold value associated with the theta sketch.

20. The system of claim 15, wherein the local data sketch is a quantile sketch, the quantile sketch being an array having multiple levels, each level being configured to hold a fixed number of data elements, and wherein the condition further corresponds to a last level of the array being populated.

* * * * *